US011313843B2

(12) United States Patent
Clare et al.

(10) Patent No.: US 11,313,843 B2
(45) Date of Patent: Apr. 26, 2022

(54) HYDROGEL SENSORS FOR DETECTION OF METAL IONS

(71) Applicant: Portland State University, Portland, OR (US)

(72) Inventors: Tami Lasseter Clare, Portland, OR (US); Capri Price, Portland, OR (US)

(73) Assignee: Portland State University, Portland, OR (US)

( * ) Notice: Subject to any disclaimer, the term of this patent is extended or adjusted under 35 U.S.C. 154(b) by 270 days.

(21) Appl. No.: 16/801,801

(22) Filed: Feb. 26, 2020

(65) Prior Publication Data

US 2020/0191757 A1   Jun. 18, 2020

Related U.S. Application Data

(63) Continuation of application No. PCT/US2018/049923, filed on Sep. 7, 2018.
(Continued)

(51) Int. Cl.
*G01N 31/22* (2006.01)
*G01N 21/3577* (2014.01)
(Continued)

(52) U.S. Cl.
CPC ......... *G01N 31/22* (2013.01); *G01N 21/3577* (2013.01); *G01N 21/6428* (2013.01);
(Continued)

(58) Field of Classification Search
CPC ......... G01N 17/008; G01N 2021/6439; G01N 21/25; G01N 21/3577; G01N 21/6428;
(Continued)

(56) References Cited

U.S. PATENT DOCUMENTS 5,441,772 A   8/1995   McAndrew et al.
6,313,646 B1  11/2001  Davis et al.
(Continued)

FOREIGN PATENT DOCUMENTS

CA   1 181 582   1/1985
CN   101726570   6/2010
(Continued)

OTHER PUBLICATIONS

Espacenet English translation of Description of CN 101726570 to Dong et al. Jun. 9, 2010 (Year: 2010).*
(Continued)

*Primary Examiner* — Jennifer Wecker
*Assistant Examiner* — Kathryn Elizabeth Limbaugh
(74) *Attorney, Agent, or Firm* — Klarquist Sparkman, LLP

(57) ABSTRACT

A method for using hydrogels to detect metal ions, including transition metal ions, comprises contacting the hydrogel in any order, with a sample potentially containing metal ions, and a solution comprising a fluorescent dye, nanoparticle, colorimetric tag, or combination thereof. The presence of metal ions in the sample may be detected by one or more suitable techniques, such as determining the color, conductivity, Raman, infrared spectrum, and/or size and/or mass change of the hydrogel. The method may be useful for detecting corrosion and/or failure of protective coating of metal structures including outdoor sculptures, building, bridges, ships, and the like.

20 Claims, 16 Drawing Sheets

Related U.S. Application Data

(60) Provisional application No. 62/555,486, filed on Sep. 7, 2017.

(51) Int. Cl.
    *G01N 21/64*      (2006.01)
    *G01N 21/65*      (2006.01)
    *G01N 21/78*      (2006.01)
    *G01N 27/06*      (2006.01)

(52) U.S. Cl.
    CPC .............. *G01N 21/65* (2013.01); *G01N 21/78* (2013.01); *G01N 27/06* (2013.01); *G01N 2021/6439* (2013.01)

(58) Field of Classification Search
    CPC ........ G01N 21/65; G01N 21/78; G01N 21/06; G01N 31/22
    See application file for complete search history.

(56) References Cited

U.S. PATENT DOCUMENTS

| | | |
|---|---|---|
| 10,107,736 B2 | 10/2018 | Clare et al. |
| 2004/0038306 A1 | 2/2004 | Agnew et al. |
| 2004/0087671 A1 | 5/2004 | Tamada et al. |
| 2009/0005667 A1 | 1/2009 | Cui et al. |
| 2010/0176006 A1 | 7/2010 | Bickford et al. |
| 2016/0095820 A1 | 4/2016 | Peppas |

FOREIGN PATENT DOCUMENTS

| | | |
|---|---|---|
| JP | 2006-249258 | 9/2006 |
| JP | 2009-227924 | 10/2009 |
| JP | 2012-153884 | 8/2012 |
| WO | WO 2011/119930 | 9/2011 |
| WO | WO 2015/013731 | 2/2015 |

OTHER PUBLICATIONS

Espacenet English translation of Description of JP 2006-249258 to Hiroaki et al. Sep. 21, 2006 (Year: 2006).*
Agrisuelas et al., "Identification of Processes Associated with Different Iron Sites in the Prussian Blue Structure by in Situ Electrochemical, Gravimetric, and Spectroscopic Techniques in the dc and ac Regimes," *The Journal of Physical Chemistry C* 116:1935-1947, 2012.
Arnold et al., "A membrane-moderated, conductimetric sensor for the detection and measurement of specific organic solutes in aqueous solutions," *Journal of Membrane Science* 167:227-239, 2000.
Baioni et al., "Synthesis and Characterization of Copper Hexacyanoferrate Nanoparticles for Building Up Long-Term Stability Electrochromic Electrodes," *Langmuir* 23:6796-6800, 2007.
Barsan et al., "High-pressure studies of the micro-Raman spectra iron cyanide complexes: Prussian blue ($Fe_4[Fe(CN)_6]_3$), potassium ferricyanide ($K_3[Fe(CN)_6]$), and sodium nitroprusside ($Na_2[Fe(CN)_5(NO)]\cdot 2H_2O$)," *Journal of Raman Spectroscopy* 42:1820-1824, 2011.
Bartóet al., "Adsorption of $^{137}Cs$ on titanium ferrocyanide and transformation of the sorbent to lithium titanate: a new method for long term immobilization of $^{137}Cs$,".
Buenger et al., "Hydrogels in sensing applications," *Progress in Polymer Science* 37:1678-1719, 2012.
Cacace et al., "The Hofmeister series: salt and solvent effects on interfacial phenomena," *Quarterly Reviews of Biophysics* 30(3):241-277, 1997.
Cai et al., "C2-Symmetric Benzene-based Low Molecular Weight Hydrogel Modified Electrode for Highly Sensitive Detection of Copper Ions," *Electrochimica Acta* 169:424-432, 2015.
Carter et al., "Fluorescent Sensors for Measuring Met al Ions in Living Systems," *Chemical Reviews* 114:4564-4601, 2014.
Collins et al., "The Hofmeister effect and the behavior of water interfaces," *Quarterly Review of Biophysics* 18(4):323-422, 1985.
Collins et al., "Ion hydration: Implications for cellular function, polyelectrolytes, and protein crystallization," *Biophysical Chemistry* 119:271-281, 2006.
Da Tacconi et al., "Metal Hexacyanoferrates: Electrosynthesis, in situ Characterization, and Application," *Chemistry of Materials* 15:3046-3062, 2003.
Dong et al., "Infrared, Raman, and Near-Infrared Spectroscopic Evidence for the Coexistence of Various Hydrogen-Bond Forms in Poly(acrylic acid)," *Macromolecules* 30:1111-1117, 1997.
England et al., "Synthesis and Characterization of Flexible Hydrogel Electrodes for Electrochemical Impedance Measurements of Protective Coatings on Metal Sculptures," *Electroanalysis* 26:1057-1067, 2014.
Funke et al., "The role of the dielectric environment in surface-enhanced Raman scattering on the detection of a 4-nitrothiophenol monolayer," *Journal of Raman Spectroscopy* 44:1010-1013, 2013.
Gao et al., "Spectroelectrochemical Sensing Based on Multimode Selectivity Simultaneously Achievable in a Single Device. 4. Sensing with Poly(vinyl alcohol)-Polyelectrolyte Blend Modified Optically Transparent Electrodes," *Analytical Chemistry* 71(18):4061-4068, Sep. 15, 1999.
García-Jareño et al., "Impedance Analysis of Prussian Blue Films Deposited on Ito Electrodes," *Electrochimica Acta* 40(9):1113-1119, 1995.
García-Jareño et al., "Electrochemical Study of Nafion Membranes/Prussian Blue Films on Ito Electrodes," *Electrochimica Acta* 41(17):2676-2682, 1996.
Gawal et al., "Responsive Hydrogels for Label-Free Signal Transduction within Biosensors," *Sensors* 10:4381-4409, 2010.
Gębala et al., "Controlled Orientation of DNA in a Binary SAM as a Key for the Successful Determination of DNA Hybridization by Means of Electrochemical Impedance Spectroscopy," *ChemPhysChem* 11:2887-2895, Sep. 10, 2010.
Gerlach et al., "Chemical and pH sensors based on the swelling behavior of hydrogels," *Sensors and Actuators B* 111-112:555-561, 2005.
Gil et al., "Crystal structure refinement, spectroscopic study and magnetic properties of yttrium hexacyanoferrate (III)," *Journal of Molecular Structure* 1003:129-133, 2011.
Gil et al., "Lead hexacyanoferrate(II) tetrahydrate: Crystal structure, FTIR spectroscopy and thermal decomposition studies," *Polyhedron* 33:450-455, 2012.
Gogoi et al., "Carbon Dots Rooted Agarose Hydrogel Hybrid Platform for Optical Detection and Separation of Heavy Metal Ions," *ACS Applied Materials & Interfaces* 7:3058-3067, 2015.
Haverd et al., "Cation Selectivity at Air/Anionic Surfactant Solution Interfaces," *Langmuir* 16:157-160, 2000.
Ho et al., "Overview of Sensors and Needs for Environmental Monitoring," *Sensors* 5:4-37, 2005.
Holtz et al., "Polymerized colloidal crystal hydrogel films as intelligent chemical sensing materials," *Nature* 389:829-832, Oct. 1997.
Hongsirikarn et al., "Effect of cations ($Na^+$, $Ca^{2+}$, $Fe^{3+}$) on the conductivity of a Nafion membrane," *Journal of Power Sources* 195:7213-7220, 2010.
Hubicki et al., "Selective Removal of Heavy Metal Ions from Waters and Waste Waters Using Ion Exchange Methods," *Ion Exchange Technology*, Chapter 8, pp. 193-240, 2012.
Jones et al., "Self-assembling electroactive hydrogels for flexible display technology," *Journal of Physics: Condensed Matter* 22(494105), 7 pages, 2020.
Kandanapitiye et al., "Gallium Analogue of Soluble Prussian Blue $KGa[Fe(CN)_6]\cdot nH_2O$: Synthesis, Characterization, and Potential Biomedical Applications," *Inorganic Chemistry* 52:2790-2792, 2013.
Kandile et al., "Environment friendly modified chitosan hydrogels as a matrix for adsorption of metal ions, synthesis and characterization," *Carbohydrate Polymers* 78:753-759, 2009.
Keggin et al., "Structures and Formulae of the Prussian Blues and Related Compounds," *Nature* 3466:577-578, Apr. 4, 1936.

(56) References Cited

OTHER PUBLICATIONS

Khan et al., "Effect of Humidity on Electrical Conductivity of Pristine and Nanoparticle-Loaded Hydrogel Nanomembranes," *The Journal of Physical Chemistry C* 119:14427-14433, 2015.

Kujawski et al., "Infrared Investigations of Sulfonated Ionomer Membranes. 1. Water-Alcohol Compositions and Counterions Effects," *Journal of Applied Polymer Science* 44(6):951-958, Feb. 25, 1992.

Kulesza et al., "Electrochemical Charging, Countercation Accommodation, and Spectrochemical Identify of Microcrystalline Solid Cobalt Hexacyanoferrate," *Journal of Physical Chemistry B* 102(11):1870-1876, 1998.

Kunz et al., "Zur Lehre von der Wirkung der Salze (About the Science of the Effect of Salts): Franz Hofmeister's historical papers," *Current Opinion in Colloid and Interface Science* 9:19-37, 2004.

Lee et al., "Glucose-Sensitive Inverse Opal Hydrogels: Analysis of Optical Diffraction Response," *Langmuir* 20:3096-3106, 2004.

Levy et al., "Infrared Investigation of Ionic Hydration in Ion-exchange Membranes. Part 2.—Alkaline Earth Salts of Grafted Polystyrene Sulphonic Acid Membranes," *Journal of the Chemical Society, Faraday Transactions, 1: Physical Chemistry in Condensed Phases 1* 78:2558-2574, 1982.

Li et al., "Synthesis and characterization of a polyacrylamide-polyacrylic acid copolymer hydrogel for environmental analysis of Cu and Cd," *Reactive & Functional Polymers* 52:31-41, 2002.

Lin et al., "Chromium(III) hexacyanoferrate(II)-based chemical sensor for the cathodic determination of hydrogen peroxide," *The Analyst* 123:159-163, Jan. 1998.

Lin et al., "DNAzyme crosslinked hydrogel: a new platform for visual detection of metal ions," *Chemical Communications* 47:9312-9314, 2011.

Lin et al., "Double Metal Ions Competitively Control the Guest-Sensing Process: A Facile Approach to Stimuli-Responsive Supramolecular Gels," *Chemistry European Journal* 20:11457-11462, 2014.

Lisowska-Oleksiak et al., "Ex situ XANES, XPS and Raman studies of poly(3,4-ethylenedioxythiophene) modified by iron hexacyanoferrate," *Synthetic Metals* 160:1234-1240, 2010.

Liu et al., "Platinum hexacyanoferrate: a novel Prussian Blue analogue with stable electroactive properties," *Journal of Electroanalytical Chemistry* 426:27-30, 1997.

Liu et al., "Studies of spectroscopy and cyclic voltammetry on a zirconium hexacyanoferrate modified electrode," *Journal of Electroanalytical Chemistry* 502:197-203, 2001.

Liu et al., "Spectroscopic and voltammetric studies on a lanthanum hexacyanoferrate modified electrode," *Journal of Electroanalytical Chemistry* 528:190-195, 2002.

Lowry et al., "An Investigation of Ionic Hydration Effects in Perfluorosulfonate Ionomers by Fourier Transform Infrared Spectroscopy," *Journal of the American Chemical Society* 102(14):4665-4667, 1980.

Mal'aováet al., "Polymeric [{Cd(en)}$_3${Fe(CN)$_6$}$_2$]•4H$_2$O: Preparation, Crystal Structure and Characterization (en= 1,2-diaminoethane)," *Zeitschrift für anorganische und allgemeine Chemie* 632-495-500, 2006.

Malinauskas et al., "Evaluation of operational stability of Prussian blue- and cobalt hexacyanoferrate-based amperometric hydrogen peroxide sensors for biosensing application," *Materials Science & Engineering C* 24:513-519, 2004.

Martínez et al., "A colorimetric iron sensor based on the partition of phenanthroline complexes into polymeric hydrogels. Combinatorial synthesis and high throughput screening of the hydrogel matrix," *Sensors and Actuators B: Chemical* 241:19-32, 2017.

Miura et al., "Tryptophan Raman Bands Sensitive to Hydrogen Bonding and Side-Chain Conformation," *Journal of Raman Spectrometry* 20(10):667-671, Oct. 1989.

Mullica et al., "Synthesis, Spectroscopic Studies, and Crystal and Molecular Structure of Bismuth Hexacyanoferrate(III) Tetrahydrate, BiFe(CN)$_6$•4H$_2$O," *Inorganica Chimica Acta* 142(1):9-12, 1988.

Muya et al., "Environmental remediation of heavy metal ions from aqueous solution through hydrogel adsorption: a critical review," *Water Science & Technology* 73.5:983-992, 2016.

Nishiyabu et al., "Dansyl-containing boronate hydrogel film as fluorescent chemosensor of copper ions in water," *RSC Advances* 2:6444-6561, 2012.

Noroozifar et al., "Preparation of silver hexacyanoferrate nanoparticles and its application for the simultaneous determination of ascorbic acid, dopamine and uric acid," *Talanta* 80:1657-1664, 2010.

Ojwang et al., "Structure Characterization and Properties of K-Containing Copper Hexacyanoferrate," *Inorganic Chemistry* 55:5924-2934, 2016.

Orthner et al., "Development, Fabrication, and Characterization of Hydrogel Based Piezoresistive Pressure Sensors with Perforated Diaphragms," *Sensors and Actuators A: Physical* 161(1-2):29-38, Jun. 2010.

Padigi, "Multivalent Rechargeable Batteries," *Dissertations and Theses, PDXScholar* pp. 1-194, 2015.

Park et al., "Selective response of cyclodextrin-dye hydrogel to metal ions," *Journal of Inclusion Phenomena and Macrocyclic Chemistry* 71:79-86, 2011.

Peppas et al., "Hydrogels in Biology and Medicine: From Molecular Principles to Bionanotechnology," *Advanced Materials* 18:1345-1360, 2006.

Pourjavadi et al., "Partially Hydrolyzed Crosslinked Alginate-graft-Polymethacrylamide as a Novel Biopolymer-Based Superabsorbent Hydrogel Having pH-Responsive Properties," *Macromolecular Research* 13(1):45-53, 2005.

Reichenberg et al., "Properties of Ion-exchange Resins in Relation to their Structure. Part II. Relative Affinities," *Journal of the Chemical Society* pp. 493-499, 1951.

Retter et al., "On the impedance of potassium nickel(II) hexacyanoferrate(II) composite electrodes—the generalization of the Randles model referring to inhomogeneous electrode materials," *Journal of Electroanalytical Chemistry* 546:87-96, 2003.

Rivas et al., "Metal Ion Uptake Properties of Acrylamide Derivative Resins," *Macromolecular Chemistry and Physics* 202:443-447, 2001.

Robin, "The Color and Electronic Configurations of Prussian Blue," *Inorganic Chemistry* 1:337-342, 1962.

Roccaro et al., "Use of log-transformed absorbance spectra for online monitoring of the reactivity of natural organic matter," *Water Research* 84:136-143, 2015.

Rounds et al., "Microporated PEG Spheres for Fluorescent Analyte Detection," *Journal of Fluorescence* 17(1):57-63, Feb. 2007.

Samain et al., "Relationship between the Synthesis of Prussian Blue Pigments, Their Color, Physical Properties, and Their Behavior in Paint Layers," *The Journal of Physical Chemistry C* 1117:9693-9712, 2013.

Samain et al., "Redox reactions in Prussian blue containing paint layers as a result of light exposure," *Journal of Analytical Atomic Spectrometry* 28:524-535, 2013.

Shakhsher et al., "An Optical Chemical Sensor Based on Swellable Dicarboxylate Functionalized Polymer Microspheres for pH Copper and Calcium Determination," *Microchimica Acta* 144:147-153, 2004.

Souda et al., "Poly (Acrylate-Acrylic acid-co-Maleic acid) hydrogel: A Cost Effective and Efficient Method for Removal of Metal Ions from Water." *Separation Science and Technology* 48:2795-2803, 2013.

Strauss et al., "Volume Changes as a Criterion for Site Binding of Counterions by Polyelectrolytes," *Journal of the American Chemical Society* 87(7):1476-1480, Apr. 5, 1965.

Strauss, "Short-Range Interactions Between Polyions and Small Ions," *Polyelectrolytes* pp. 79-85, 1974.

Sun, "Raman spectroscopy study of the effects of dissolved NaCl on water structure," *Vibrational Spectroscopy* 62:110-114, 2012.

Szunerits et al., "Aluminum Surface Corrosion and the Mechanism of Inhibitors Using pH and Met al Ion Selective Imaging Fiber Bundles," *Analytical Chemistry* 74(4):886-894, 2002.

Tansel, "Significance of thermodynamic and physical characteristics of permeation of ions during membrane separation: Hydrated

(56) References Cited

OTHER PUBLICATIONS radius, hydration free energy and viscous effects," *Separation and Purification Technology* 86:119-126, 2012.

Tchounwou et al., "Heavy Metals Toxicity and the Environment," *Experientia Supplementum* 101:133-164, 2012.

Torii et al., "Effects of Hydration on the Structure, Vibrational Wavenumbers, Vibrational Force Field and Resonance Raman Intensities of N-Methylacetamide," *Journal of Raman Spectrometry* 29:537-546, 1998.

Valle et al., "Poly(N-vinylpyrrolidone-co-2-methylpropanesulfonate sodium): Synthesis, Characterization, and its Potential Application for Removal of Metal Ions from Aqueous Solution," *Journal of Applied Polymer Science*, 41272, pp. 1-7, 2015.

Vlachy et al., "Hofmeister series and specific interactions of charged headgroups with aqueous ions," *Advances in Colloid and Interface Science* 146:42-47, 2009.

Voiculescu et al., "Micropreconcentrator for Enhanced Trace Detection of Explosives and Chemical Agents," *IEEE Sensors Journal* 6(5):1095-1104, Oct. 2006.

Wang et al., "The Comparison of Chemiluminescent- and Colorimetric-detection Based ELISA for Chinese Hamster Ovary Host Cell Proteins Quantification in Biotherapeutics," *Journal of Bioprocessing & Biotechniques* vol. 3, Issue 2, pp. 1-7, 2013.

Wu et al., "Colorimetric Aptasensor Based on Enzyme for the Detection of *Vibrio parahemolyticus*," *Journal of Agriculture and Food Chemistry* 63:7849-7854, 2015.

Yang et al., "Interdigitated Array Microelectrode-Based Electrochemical Impedance Immunosensor for Detection of *Escherichia coli* O157:H7," *Analytical Chemistry* 76(4):1107-1113, Feb. 15, 2004.

Zamora et al., "Quantitative Colorimetric Analysis of Some Inorganic Salts Using Digital Photography," *Analytical Letters* 44:1674-1682, 2011.

Zhao et al., "Superabsorbent hydrogels from poly(aspartic acid) with salt-, temperature- and pH-responsiveness properties," *Polymer* 46:5368-5376, 2005.

Zhu et al., "Synthesis and Characterization of Poly(Acrylamide-co-2-Acrylamido-2-Methylpropane Sulfonic Acid)/Kaolin Superabsorbent Composite," *Journal of Macromolecular Science, Part A: Pure and Applied Chemistry* 50:175-184, 2013.

Cano et al., "Electrochemical characterization of organic coatings for protection of historic steel artifacts," *Journal of Solid State Electrochemistry* 14(3):453-463, 2010.

Cano et al., "Use of EIS for the evaluation of the protective properties of coatings for metallic cultural heritage: a review.," *Journal of Solid State Electrochemistry* 14:381-391, 2010.

Cano et al., "A novel gel polymer electrolyte cell for in-situ application of corrosion electrochemical techniques," *Electrochemistry Communications* 41:16-19, 2014.

Carullo et al., "Low-Cost Electrochemical Impedance Spectroscopy System for Corrosion Monitoring of Metallic Antiquities and Works of Art," *IEEE Transactions on Instrumentation and Measurement* 49(2):371-375, 2000.

Clare et al., "Elevation of fluorinated protective coatings for outdoor metals," *Protection of Metal Artefacts* 5:83-87, 2007.

Corbellini et al., "Noninvasive Solution for Electrochemical Impedance Spectroscopy on Metallic Works of Art," *IEEE Transactions on Instrumentation and Measurement* 61(5):1193-1200, 2012.

Degrigny, "Use of electrochemical techniques for the conversation of metal artefacts: a review," *Journal of Solid State Electrochemistry* 14:353-361, 2010.

Eggins et al., Skin Contact Electrodes for Medical Applications, *Analyst* 118:439-442, 1993.

England et al., "Synthesis and Characterizations of Flexible Hydrogel Electrodes for Electrochemical Impedance Measurements of Protective Coatings on Metal Sculptures," *Electroanalysis* 26(5):1059-1067, 2014.

Extended European Search Report dated Nov. 8, 2016 from European Patent Application No. 14810867.3.

International Search Report and Written Opinion dated Aug. 13, 2014 from International Application No. PCT/US2014/041743.

International Search Report and Written Opinion dated Jan. 9, 2019 from International Application No. PCT/US2018/049923.

Kosec et al., "The comparison of organic protective layers on bronze and copper," *Progress in Organic Coatings* 69:199-2016, 2010.

Qi et al., "Two-Electrode Electrochemical Impedance Sensor: Part 1—Response to Coating Degradation on conductive Substrates," *Corrosion* 65(5):343-349, 2009.

Qi et al., "Two-Electrode Electrochemical Impedance Sensor: Part 2—Impedance Measurement and Simulation of Coatings on Nonmetal Substrates," *Corrosion* 66(2):025002-1-025002-10, 2010.

Swartz et al., "Understanding the differences in film formation mechanisms of two comparable solvent based and water-borne coatings on bronze substrates by electrochemical impedance spectroscopy," *Electrochimica Acta* 62:199-206, 2012.

Swartz et al., "Characterizing and improving performance properties of thin solid films produced by weatherable water-borne colloidal suspensions on bronze substrates," *Progress in Organic Coatings* 75:215-223, 2012.

\* cited by examiner

| Transition Metal Ion | Hexacyanoferrate Ion | Color Formed | Clear or Precipitate |
|---|---|---|---|
| $Cu^{2+}$ | Ferrocyanide | Dark Red | Clear |
| *$Cu^{2+}$ | Ferricyanide | Golden yellow | Precipitate |
| $Pb^{2+}$ | Ferrocyanide | White | Precipitate |
| $Pb^{2+}$ | Ferricyanide | No color change observed | n/a |
| $Al^{3+}$ | Ferrocyanide | No color change observed | n/a |
| $Al^{3+}$ | Ferricyanide | No color change observed | n/a |
| $Co^{2+}$ | Ferrocyanide (note: presence of $Na^+$ required) | Grayish aqua | Precipitate |
| *$Co^{2+}$ | Ferricyanide | Reddish brown/purple | Clear |
| $Sn^{2+}$ | Ferrocyanide | White | Precipitate |
| $Sn^{2+}$ | Ferricyanide | No color change observed | n/a |
| $Cd^{2+}$ | Ferrocyanide | Cloudy white | Likely Precipitate |
| $Cd^{2+}$ | Ferricyanide | Bright yellow | Precipitate |
| $Cr^{2+}$ | Ferrocyanide | No color change observed | n/a |
| $Cr^{2+}$ | Ferricyanide | No color change observed | n/a |
| *$Mn^{2+}$ | Ferrocyanide | Cloudy white | Likely precipitate |
| $Mn^{2+}$ | Ferricyanide | No color change observed | n/a |
| $Mn^{2+}$ | Mixed | Brown | Precipitate |
| $Zn^{2+}$ | Ferrocyanide | Yellow/brown | Precipitate |
| $Zn^{2+}$ | Ferricyanide | Yellow/brown | Precipitate |
| $Ni^{2+}$ | Ferrocyanide | Yellow/brown | Precipitate |
| $Ni^{2+}$ | Ferricyanide | Yellow/brown | Precipitate |
| $Zr^{2+}$ | Ferrocyanide | No color change observed | n/a |
| $Zr^{2+}$ | Ferricyanide | No color change observed | n/a |
| $Mo^{3+}$ | Ferrocyanide | Orange | Clear |
| $Mo^{3+}$ | Ferricyanide | No color change observed | n/a |
| $Ag^+$ | Ferrocyanide | No color change observed | n/a |
| $Ag^+$ | Ferricyanide | Orange | Precipitate |

FIG. 3

HYDROGEL SENSORS FOR DETECTION OF METAL IONS

CROSS REFERENCE TO RELATED APPLICATION

This application is a continuation of International Application No. PCT/US2018/049923, filed Sep. 7, 2018, which was published in English under PCT Article 21(2), which in turn claims the benefit of the earlier filing date of U.S. provisional patent application No. 62/555,486, filed on Sep. 7, 2017, both of which are incorporated herein by reference in their entireties.

ACKNOWLEDGMENT OF GOVERNMENT SUPPORT

This invention was made with government support under grant No. CHE-1139230 awarded by National Science Foundation. The government has certain rights in the invention.

FIELD

This disclosure concerns embodiments of a method for detecting metal ions using hydrogels.

BACKGROUND

One of the important contributors to the deterioration of artistic and historic metalwork is corrosion. Therefore, there is a continuing need to develop methods to better monitor and protect these works, and to monitor the efficacy of protective treatments. To prevent degradation and corrosion of outdoor artwork, pigmented or clear protective coatings must be applied periodically to counteract the effects of pollutants, salts, light and moisture. Preferably, monitoring methods are non-invasive so as to not damage or alter the substrate, and they should measure a relevant parameter. Coating gloss, thickness and/or wettability are commonly reported parameters used by collections care personnel to monitor changes induced by weathering over time. While changes in the visual appearance of coatings are important, they may not directly correlate with changes in the permeability or porosity of a coating. For example, a coating may thin and lose gloss while remaining protective meaning that costly maintenance may be unnecessary, or a coating may become porous to electrolytes while visually maintaining its film thickness. On the other hand, extremes of visible changes (e.g. chalking, flaking and corrosion) typically are signs of a failed coating and that non-reversible damage to the underlying artwork has already occurred, and thus these visual markers cannot be relied upon as a cue for timely maintenance.

SUMMARY

Disclosed herein are embodiments of a method for detecting metal ions. The method comprises contacting a hydrogel with, in any order, a sample potentially comprising one or more metal ions having an atomic weight greater than sodium, and a solution comprising a fluorescent dye, nanoparticle, colorimetric tag, or combination thereof. If metal ions are present in the sample, at least some of the metal ions are absorbed by the hydrogel. The method further comprises determining at least one characteristic of the hydrogel, such as a color, conductivity, Raman spectrum, infrared spectrum, and/or a change in size or mass of the hydrogel, and determining the presence or absence of the one or more metal ions in the sample based upon at least one characteristic determined.

The hydrogel may comprise water and cross-linked hydrophilic organic polymer molecules. And the organic polymer molecules may comprise head groups selected from carboxylic acids, ammonium ions, sulfonates, amides, amines, phosphates, phosphonates, hydroxyls, thiols, or combinations thereof. Additionally, or alternatively, the fluorescent dye, nanoparticle, colorimetric tag, or combination thereof, may comprise ferricyanide, ferrocyanide, or a combination thereof.

In some embodiments, the hydrogel is contacted with the solution comprising a fluorescent dye, nanoparticle, colorimetric tag, or combination thereof, and then with the sample potentially comprising one or more metal ions. In alternative embodiments, the hydrogel is first contacted with the sample, and then by the solution. In such embodiments, contacting the hydrogel with the solution may comprise removing the hydrogel from contact with the sample, applying an aliquot of the solution to a surface of the hydrogel, and waiting for a suitable time period, such as from greater than zero to 2 hours or more, from 1 minute to 90 minutes, or from 10 minutes to 60 minutes, before determining at least one characteristic of the hydrogel. The aliquot of the solution may comprise the fluorescent dye, nanoparticle, colorimetric tag, or combination thereof, such as ferricyanide and/or ferrocyanide ions, in an amount stoichiometrically greater than or equal to a maximum amount of metal ions that the hydrogel can absorb.

In any of the disclosed embodiments, the method may further comprise soaking the hydrogel in an electrolyte solution for a period of time prior to contacting the hydrogel with the sample and fluorescent dye, nanoparticle, colorimetric tag, or combination thereof. The electrolyte solution may comprise an aqueous solution of NaCl, KCl, RbCl, CsCl, $MgCl_2$, $CaCl_2$, $SrCl_2$, or a combination thereof, or any ionic electrolyte or combination of ionic electrolyte solutions. Additionally, or alternatively, the hydrogels may be washed in an aqueous solution comprising organic solvents and/or humectants, such as ethylene glycol, glycerol, dimethyl sulfoxide, methanol, and/or ethanol. The organic solvents and/or humectants may be dissolved in the water at a concentration suitable to facilitate preparing the hydrogel, such as from greater than zero to 90% in water, from 5% to 80% in water, from 10% to 70% in water or from 10% to 50% in water. And/or the hydrogels may be washed in a buffer solution. Exemplary buffer solutions include, but are not limited to, 2,2-bis(hydroxymethyl)-2,2',2"-nitrilotriethanol or tris(hydroxymethyl)aminomethane. The buffer solution may be at a pH suitable to facilitate preparation of the hydrogel, such as from 3 or less to 10 or more, from 4 to 9, or from 5 to 8.5. In certain embodiments, the pH is from 5 to 7, such as from 5.5 to 7, and in other embodiments, the pH is from 7 to 8.5. The buffer solution may be at a concentration suitable to facilitate preparing the hydrogel and/or provide a suitable pH. The concentration may be from greater than zero to 1 M or more, such as from 0.1 M to 1M.

In some embodiments, the characteristic is or comprises the color of the hydrogel. The method may comprise measuring an intensity of the color, and correlating the intensity of the color to a concentration of the one or more metal ions.

In some embodiments, the characteristic is or comprises the conductivity of the hydrogel. In such embodiments, the method may further comprise quantifying the one or more metal ions absorbed by the hydrogel, such as by determining the conductivity of the hydrogel, and comparing the conductivity of the hydrogel to a baseline conductivity of the hydrogel prior to contact with the sample to determine a change in conductivity. The metal ion may be identified based on the change in conductivity as one of a group of metal ions known to increase conductivity of the hydrogel or as one of a group of metal ions known to decrease conductivity of the hydrogel. Additionally, or alternatively, the metal ions absorbed by the hydrogel may be quantified by correlating the change in conductivity to a concentration of the one or more metal ions. Determining the conductivity of the hydrogel may comprise contacting the hydrogel with two electrodes, applying an alternating current across the two electrodes, measuring an electrochemical impedance, and calculating the conductivity of the hydrogel based on the electrochemical impedance. The electrochemical impedance may be measured at a single frequency, or by measuring an electrochemical impedance spectrum over a range, such as from 1 MHz to 0.1 Hz. The method may further comprise determining an amount of the one or more metal ions in the hydrogel based on the calculated conductivity.

In some embodiments, the characteristic is or comprises the size of the hydrogel. The method may further comprise determining a first size or mass of the hydrogel prior to contact with the sample and the solution, and determining a second size or mass of the hydrogel after contact with both the sample and the solution. The second size or mass is then compared with the first size or mass to provide a comparison. The metal ion may be identified based on the comparison as one of a group of metal ions known to increase the size or mass of the hydrogel or one of another group of metal ions known to decrease the size or mass of the hydrogel, and/or a concentration of the metal ions may be quantified based at least in part on the comparison.

Additionally, or alternatively, the method may comprise determining an identity of the one or more metal ions. Determining the identify may be performed by identifying the color of the hydrogel as indicative of a particular metal ion, identifying characteristic peaks in the Raman spectrum as indicative of a particular metal ion, and/or identifying characteristic peaks in the infrared spectrum as indicative of a particular metal ion.

In any embodiments, the metal ion may be a transition metal ion, lanthanide metal ion, aluminum ion, arsenic ion, bismuth ion, indium ion, lead ion, tin ion, or any combination thereof. Exemplary metal ions include, but are not limited to, $Fe^{2+}$, $Fe^{3+}$, $Cu^+$, $Cu^{2+}$, $As^{3+}$, $Cd^{2+}$, $Cr^{3+}$, $Pb^{2+}$, $Hg^{2+}$, $Ti^{4+}$, $Sn^{4+}$, $Al^{3+}$, $Mn^{2+}$, $Zn^{2+}$, $Co^{2+}$, $Ni^{2+}$, $Pd^{2+}$, $In^{3+}$, $Ga^{2+}$, $Y^{3+}$, $Zr^{4+}$, $Ag^+$, $La^{3+}$, $Pt^{2+}$, $Bi^{3+}$, or any combination thereof.

The hydrophilic organic polymers may comprise monomers, such as acrylate and/or vinyl monomers. Additionally, or alternatively, the monomers may be selected from 2-acrylamido-2-methyl-1-propanesulfonic acid, acrylic acid, acrylamide, methacrylic acid, vinyl alcohol, vinyl acetate, vinyl benzoic acid, vinyl sulfonic acid, maleic acid, 2-hydroxyethyl methacrylate, 2-hydroxypropyl methacrylate, lactic acid, itaconic acid, 3-allyloxy-2-hydroxy-1-propanesulfonic acid, or a combination thereof. In particular embodiments, the hydrogel is a cross-linked poly(acrylic acid-co-2-acrylamido-2-methyl-1-propanesulfonic acid (poly(AA-AMPS)) hydrogel comprising 2-acrylamido-2-methyl-1-propanesulfonic acid and poly(acrylic acid). The cross-linked poly (AA-AMPS) hydrogel may have a weight percent ratio of 2-acrylamido-2-methyl-1-propanesulfonic acid to poly (acrylic acid) from 1.5 to 2.0. And/or the cross-linked poly(AA-AMPS) hydrogel may comprise 0.2-0.3 wt % N,N'-methylenebis(acrylamide). Additionally, or alternatively, the cross-linked poly(AA-AMPS) hydrogel may further comprise a humectant, such as glycerol.

The foregoing and other objects, features, and advantages of the invention will become more apparent from the following detailed description, which proceeds with reference to the accompanying figures.

BRIEF DESCRIPTION OF THE DRAWINGS

FIG. 3 is a table providing the respective colors of various transition metal solutions when combined with either $FeCN_6^{3-}$ (ferricyanide) or $FeCN_6^{4-}$ (ferrocyanide). * denotes an ion combination pictured in FIG. 2.

DETAILED DESCRIPTION

I. Terms and Definitions

Figure 1:
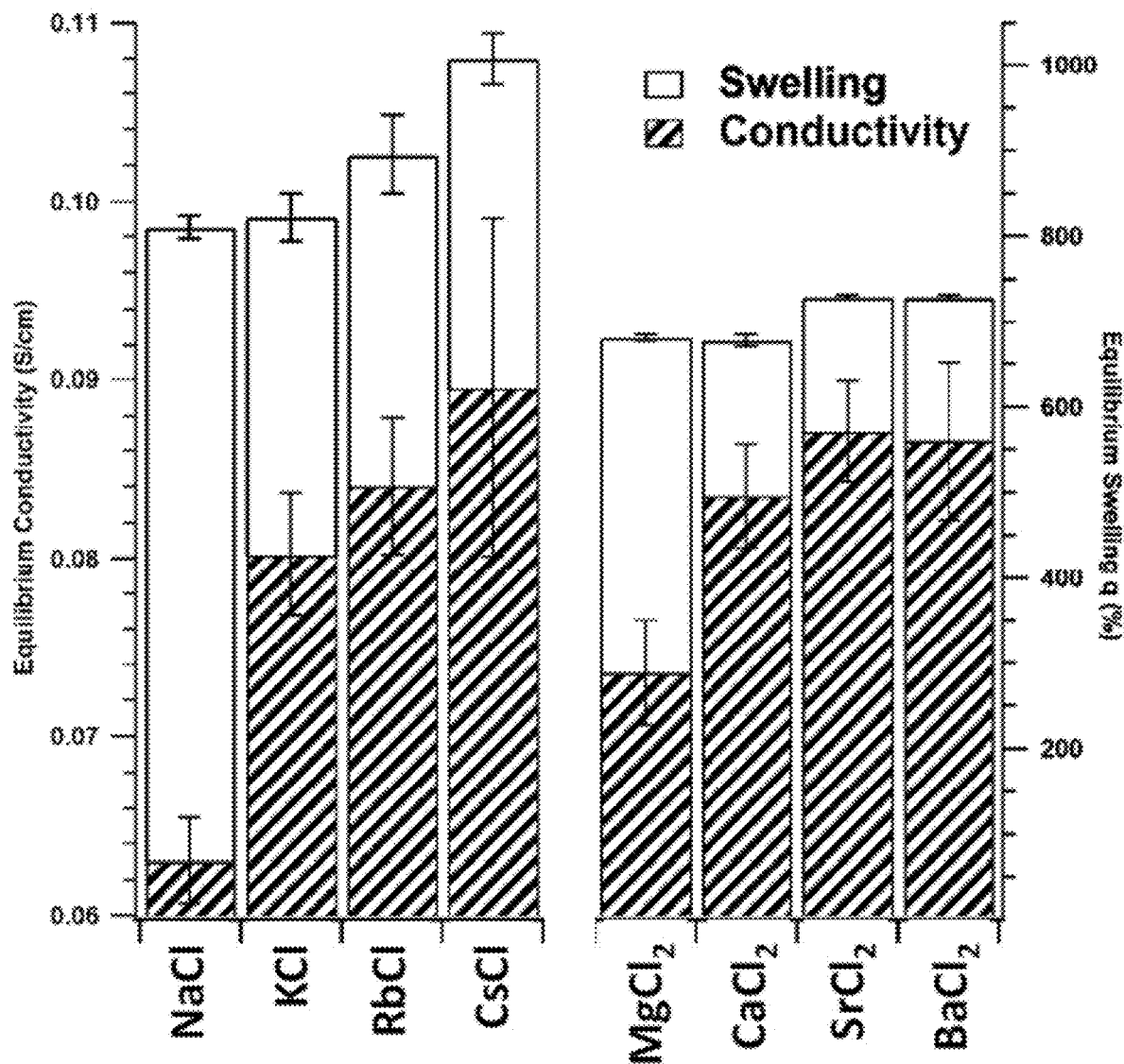
FIG. 1 is a graph showing the relationship between swelling and conductivity for hydrogels soaked in various electrolytes.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

AMPS: 2-Acrylamido-2-methyl-1-propanesulfonic acid.

EIS: Electrochemical impedance spectrum.

Electrolyte: A substance containing free ions that behaves as an electrically conductive medium. Electrolytes generally comprise ions in a solution, but molten electrolytes and solid electrolytes also are known.

Humectant: A hygroscopic substance that attracts and retains moisture via absorption. Humectants often are molecules including several hydrophilic groups, e.g., hydroxyl groups, amines, or carboxyl groups. Exemplary humectants include, but are not limited to, propylene glycol, hexylene glycol, butylene glycol, glyceryl triacetate, vinyl alcohol, sugar alcohols (e.g., glycerol, sorbitol, xylitol), polymeric polyols, urea, and alpha hydroxy acids.

Hydrogel: A substance formed when a hydrophilic organic polymer (natural or synthetic) is cross-linked via covalent, ionic, and/or hydrogen bonds to create a three-dimensional open-lattice structure which takes up water molecules to form a gel. When a hydrogel takes up soluble electrolytes it may become conductive.

Impedance: Electrical impedance measures the opposition in an electrical circuit to passage of current when a voltage is applied. When direct current is applied to a circuit, impedance is the same as resistance. However, when alternating current is applied, impedance has both magnitude (resistance) and phase. The magnitude is the ratio of the voltage amplitude to the current amplitude, and the phase is the phase shift by which the current is ahead of the voltage. Impedance typically is measured in ohms.

Metal: An element other than hydrogen that forms a cation when compounds of it are in aqueous solution and oxides of the element forms a hydroxide rather than an acid in water. As used herein metals include all elements of the alkali, alkali-earth, inner-transition (lanthanides and actinides series), transactinides and transition series.

Transition metal: An element from the d-block of the periodic table, including the lanthanide and actinide series.

MBA: N,N'-methylenebis(acrylamide).

PAA: Poly(acrylic acid).

Permeable: Permeable means capable of being passed through. The term permeable is used especially for materials through which gases or liquids may pass. Permeability is the quality or state of being permeable.

Polymer: A molecule of repeating structural units (e.g., monomers) formed via a chemical reaction, i.e., polymerization.

Substrate: A substance or layer that underlies something. As used herein, the term substrate refers to the surface or object on which a coating is applied.

II. Overview

The ability of sorbent materials to collect analytes is closely tied to performance characteristics in sensors, responsive materials, analyte-delivery, and remediation systems across a wide range of fields including biomedicine, corrosion science and environmental monitoring and clean-up. Hydrogels have been employed in many such devices because of their attractive characteristics, such as their compositional variability, tunable mechanical properties, electrolyte exchangeability, sensitivity to stimuli, low electrical impedance, portability, and low cost. Headgroups of hydrogels include carboxylic acids, ammonium, sulfonates, amides, amines, phosphates, phosphonates, thiols, hydroxyls, or combinations thereof, which can all be leveraged to effectively absorb and concentrate metal ions from solution, allowing for detection limits in the sub-ppm range. Common device responses are generated by analyte-headgroup interactions that act to swell or de-swell the hydrogel, while others involve an added marker in the form of a fluorescent dye, nanoparticle, colorimetric tag, or combination thereof, which then gives a measurable spectral change of the gel in response to analyte concentration. Still others use electrical changes within hydrogels from altered resistance, capacitance, impedance or voltammetry. Hydrogels often are multi-responsive materials that produce multiple signals or responses to analytes. Because the various responses of the hydrogels to analytes are usually correlated, hydrogels are of great interest in dual-functional devices, such as spectroelectrochemical devices.

Detection of metal ion analytes enables important research questions to be addressed in many fields, including bio-sensing, environmental monitoring and corrosion science. The ability to determine the concentration of transition metal ions present in the human body, a body of water, in the air, or on a potentially corroding metal surface is often useful in order to make informed decisions and treatment plans. In the case of corrosion of steel and copper alloys, detection of small amounts of $Fe^{2+}$, $Fe^{3+}$, $Cu^+$ and $Cu^{2+}$ could permit the development of an early corrosion warning system, capable of signaling the failure of anti-corrosion measures, such as protective coatings or cathodic protection. In the case of environmental analysis, real-time monitoring of heavy metal ions, such as $As^{3+}$, $Cd^{2+}$, $Cr^{3+}$, $Pb^{2+}$ or $Hg^{2+}$, which are considered to be of highest significance to health, could warn if a factory, or agricultural practice, etc., presents a risk to the public and/or environment.

The formation of Prussian blue (PB), the blue pigmented complex $Fe_4(III)[Fe(II)(CN)_6]_3$, has been used to detect $Fe^{2+}$ or $Fe^{2+}$ in solution when salts of ferricyanide $[Fe(CN)_6]^{3-}$, or ferrocyanide $[Fe(CN)_6]^{4-}$, respectively, are used. Complexes of other transition and lanthanide metal ions (e.g. $Cu^{2+}$, $Ti^{4+}$, $Cr^{3+}$, $Sn^{4+}$, $Sn^{2+}$, $Al^{3+}$, $Mn^{2+}$, $Zn^{2+}$, $Co^{2+}$, $Ni^{2+}$, $Pd^{2+}$, $In^{3+}$, $Ga^{2+}$, $Y^{3+}$, $Zr^{4+}$, $Ag^+$, $Cd^{2+}$, $La^{3+}$, $Pb^{2+}$, $Pt^{2+}$, $Mo^{5+}$, and $Bi^{3+}$) may be also be formed with salts of ferricyanide or ferrocyanide, having the general formula of $M^{x+}[Fe(CN)_6]^{y-}{}_{x/y}$ where M is a transition metal. Both hexacyanoferrate ions and metal hexacyanoferrate complexes can be characterized by impedance spectroscopy in solution and the unique colors of the complexes allow for spectral differentiation of the metal ions present.

This disclosure concerns the discovery that such complexes also form within hydrogels and can be used in transition metal ion sensing applications by colorimetric, electrical and mechanical/volumetric changes. Such hydrogels may be useful for applications including, but not limited to, sensors, environmental remediation, imaging, and energy conversion.

The electrical and mechanical changes that may occur within hydrogels upon formation of metal hexacyanoferrates may be influenced by the thermodynamic principles that drive interactions between cations and headgroups. Without being bound to a particular theory, ions of similar size may have similar enthalpies of hydration, which may make them more likely to form close ion pairs than ions of dissimilar sizes. These principles can be extended to polyelectrolytes, where, for example, a sulfonic acid headgroup is considered to be chaotropic because it is more likely to form close ion pairs with large, weakly hydrated ions. If the equation for conductivity is considered:

$$\sigma = n\mu Z \qquad (1)$$

where σ is conductivity, n is number of charge carriers, µ is the mobility of the charge carriers, and Z is the charge of those carriers, it is possible to see that the mobility parameter will be altered by the degree of association between the headgroup and cation.

The hydrogel response to soluble transition metal ions, in turn, affects the viscosity of water contained within the hydrogel. Viscosity of different aqueous salt solutions is dependent upon the hydration free energy and the hydrated radius of the cation. A strong hydration shell causes more resistance to flow, and an increased viscosity of water. These types of ions are often categorized as kosmotropic, which have a polarity greater than that of water and thus their presence encourages hydrogen bonding between water molecules. The changing viscosity of the water as different types of ions are introduced may also stimulate changes in the impedance of the hydrogels.

Hydrogels composed of polyacrylic acid (PAA) co-polymerized with acrylamido-methyl propane sulfonic acid (AMPS) were exposed to soluble transition metal ions. PAA is known to have a strong proton affinity, so AMPS is likely the primary ion exchanger in this case. After exposure to transition metal ions, the hydrogels are treated with ferricyanide or ferrocyanide to form Prussian blue or one of its metal hexacyanoferrate analogues. In other embodiments, the hydrogels are pre-treated with the ferricyanide or ferrocyanide and then exposed to transition metal ions. The formation of this complex affects the impedance of the hydrogels, and the unique colors of the complexes allow for differentiation of the metal ions present. An advantage of the disclosed method is the robust nature of the impedimetric detection; there is no need for a marker or tag that could become photobleached or lose sensitivity over time. In order to measure the concentration of metal ion present, it may only necessary to measure the impedance at one frequency, allowing for a rapid quantitative measurements with relatively simple data interpretation. But in alternative embodiments, the impedance is measured over a range of frequencies sufficient to produce an electrical impedance spectrum, such as from 1 MHz or more to 0.1 MHz or less. These hydrogels have already been utilized to assess the protective quality of coatings on coated outdoor metalworks (e.g. sculptures) using impedance spectroscopy, demonstrating its ability to be used as a portable sensor (see U.S. patent application Ser. No. 14/896,509, incorporated herein by reference in its entirety). Disclosed herein is a method for using hydrogels to act not only as the solid electrolyte in an impedimetric sensing device, but to collect and have an active response to transition metal ions.

III. Hydrogels

Hydrogels suitable for use in the present technology include any hydrogel that can absorb a desired metal ion and provide a response to that absorption. A response may be, but is not limited to, swelling or de-swelling; an electrical change including altered resistance, capacitance, impedance, voltammetry, or a combination thereof; a spectral change with an addition of one or more of a fluorescent dye, nanoparticle, colorimetric tag; or any combination thereof. In some embodiments, the hydrogel may comprise water and cross-linked hydrophilic organic polymer molecules. The organic polymer molecules may comprise head groups selected from carboxylic acids, ammonium ions, sulfonates, amides, amines, phosphates, phosphonates, hydroxyls, thiols, and combinations thereof. Additionally, or alternatively, the hydrogel may be selected to have a head group suitable to absorb the metal ion. In some example, the head group type and/or concentration is selected to increase or decrease the sensitivity and/or detection limit of the hydrogel to a certain metal ion. Additionally, or alternatively, the head group type and/or concentration may be selected to change or provide a certain mechanical property of the hydrogel, such as, but not limited to, compressibility, yield strength or tensile strength. The hydrophilic organic polymers may comprise any suitable monomers, such as, but not limited to, acrylate and/or vinyl monomers. Exemplary monomers include, but are not limited to, 2-acrylamido-2-methyl-1-propanesulfonic acid, acrylic acid, acrylamide, methacrylic acid, vinyl alcohol, vinyl acetate, vinyl benzoic acid, vinyl sulfonic acid, maleic acid, 2-hydroxyethyl methacrylate, 2-hydroxypropyl methacrylate, lactic acid, itaconic acid, 3-allyloxy-2-hydroxy-1-propanesulfonic acid or combinations thereof.

One exemplary flexible hydrogel suitable for use in the present technology comprises cross-linked poly(acrylic acid-co-2-acrylamido-2-methyl-1-propanesulfonic acid) (poly(AA-AMPS)). In some embodiments, the weight percent ratio of 2-acrylamido-2-methyl-1-propanesulfonic acid (AMPS) to poly(acrylic acid) (PAA) in the gel ranges from 1.5 to 2.0, such as from 1.5 to 1.8, or from 1.6 to 1.8. In some examples, the ratio was 1.6-1.7. The final composition of the hydrogel comprises 15-25 wt % AMPS, such as 17-25 wt % AMPS or 15-20 wt % AMPS, and 10-20 wt % PAA, such as 10-15 wt % PAA. For example, the hydrogel may comprise 17-20 wt % AMPS and 10-12 wt % PAA.

Embodiments of the hydrogel further comprise a cross-linker, water, and trace amounts of polymerization initiators. Any cross-linker capable of cross-linking p(AA-AMPS) can be used. One exemplary cross-linker is N,N'-methylenebis(acrylamide) (MBA). In some embodiments, the cross-linker is added in an amount equal to 1-2 wt % of the mass of AMPS, such as 1-1.5 wt % of the mass of AMPS, or 1.2 wt % of the mass of AMPS. In a working embodiment, the hydrogel included 18-19 wt % AMPS and 0.2-0.3 wt % MBA.

Suitable polymerization initiators include, but are not limited to, potassium persulfate, potassium metabisulfite, and iron (II) sulfate. Trace amounts (e.g., less than 0.1 wt %) of the initiator(s) may be present in the hydrogel. In some embodiments, the initiator(s) is added in an amount equal to 0.05-0.15 wt % of the mass of AMPS. In one embodiment, potassium persulfate and potassium metabisulfite were added in amounts equal to 0.075-0.15 wt % of AMPS, such as 0.1 wt %. In another embodiment, iron (II) sulfate was added in an amount equal to 0.05-0.075 wt % of AMPS.

The hydrogel also may include a humectant. Suitable humectants include sugar polyols, e.g., glycerol, sorbitol, xylitol. In some embodiments, the hydrogel comprises 7-18 wt % humectant, such as from 9-13 wt % glycerol.

The hydrogel further comprises water. In some embodiments, the hydrogel comprises 50-65 wt % water. The amount of water absorbed by the hydrogel may depend, in part, on the extent of cross-linking within the polymer matrix. As the percentage of water in the hydrogel increases, the hydrogel becomes more mechanically fragile and may tear easily.

The hydrogel may be soaked in an electrolyte. In some embodiments, this may be beneficial, for example, to provide conductivity. An electrolyte is incorporated into the hydrogel by soaking the polymerized gel in an electrolyte solution. Suitable electrolytes include, but are not limited to, chloride salts (e.g., NaCl, KCl, RbCl, CsCl, $MgCl_2$, $CaCl_2$, $SrCl_2$, $BaCl_2$), potassium salts (e.g., $K_2SO_3$, KHEPES (2-[4-(2-hydroxyethyl)piperazin-1-yl]ethanesulfonic acid, potassium salt), $K_2$PIPES (piperazine-1,4-bis-2-ethanesulfonic acid, potassium salt), $KHCO_3$, $K_2CO_3$, $KC_2H_3O_2$, KBr, KI, $K_3PO_4$, $KH_2PO_4$, $K_2HPO_4$), sodium salts (e.g., $Na_2SO_3$, NaHEPES, $Na_2$PIPES) and calcium salts (e.g., $Ca(C_2H_3O_2)_2$, $Ca(NO_3)_2$).

The hydrogel may be characterized by its swellability and/or conductivity. Equation 2 defines gel swelling, $q_t$, as:

$$q_t = \frac{(m_t - m_{dry})}{m_{dry}} \times 100 \qquad (2)$$

where $m_t$ is mass of the wet gel and $m_{dry}$ is mass of the dry gel. Swelling is driven by anion-anion repulsive forces. The hydrogel swells and absorbs water until equilibrium between osmotic pressure and elastic restoring force is reached. Swelling capacity depends, in part, on salt concentration and the charge screening effect produced by mobile cations ("ionic cross-linking"). As the charge screening effect increases, swelling decreases. Additionally, as polymer-salt interactions increase, swelling decreases. Swelling is typically less when the electrolyte comprises a divalent cation than when the electrolyte comprises a monovalent cation. As the size of the divalent or monovalent cations increases, $q_t$, increases. Thus, the following swelling trends are observed: $Na^+<K^+<Rb^+<Cs^+$, and $Mg^{2+}<Ca^{2+}<Sr^{2+}<Ba^{2+}$. For example, a hydrogel comprising CsCl typically will swell more than a hydrogel comprising NaCl. In some embodiments, $q_t$, ≤1000%, such as 600-1000%, 600-800%, or 600-700%. Typical ranges are 600-800% for divalent chloride salts, 800-1000% for monovalent chloride salts, 600-700% for KHEPES and $K_2$PIPES, and 800-1000% for other potassium salts.

Desirably, after soaking in electrolyte, the hydrogel has a gel conductivity≥0.05 S/cm². In some embodiments, the conductivity is 0.07-0.10 S/cm². Conductivity generally increases as cation size increases and/or as polymer-salt interactions decrease. Typical conductivity ranges are 0.06-0.075 S/cm² for 1M NaCl and $MgCl_2$; 0.08-0.10 S/cm² for rest of the chloride salts; 0.05-0.10 S/cm² for most other potassium salts, except for KHEPES, which is about 0.035 S/cm². Other lower conductivity salts (below 0.05 S/cm²) include $Na_2$PIPES and calcium acetates. The 0.5 M salts (KCl, $KHCO_3$, $KH_2PO_4$, $K_2$PIPES) typically provide a conductivity between 0.035 and 0.055 S/cm². Advantageously, the hydrogel has minimal swelling and maximum conductivity (FIG. 1). In some embodiments, desirable conditions are obtained when the electrolyte is $CaCl_2$. In some embodiments, the salt has a concentration suitable to facilitate the hydrogel having a suitable gel conductivity. The salt concentration may be from greater than zero to 2M or more, such as from 5 mM to 1.5M, or from 10 mM to 1M.

IV. Method of Making Hydrogels

Embodiments of the disclosed hydrogels are prepared by combining 2-acrylamido-2-methylpropanesulfonic acid, poly(acrylic acid), a cross-linker and, optionally, a humectant in an aqueous solution. In some embodiments, the AMPS and PAA solutions comprise sodium salts of AMPS and PAA, respectively. Polymerization initiators are added to the solution with mixing. After thorough mixing, the solution is transferred into casting molds and allowed to polymerize for a suitable period of time, e.g., 0.5-30 minutes at room temperature. The polymerization time depends, in part, on the temperature, the initiator composition and/or the initiator concentration. With iron (II) sulfate, polymerization occurs substantially immediately, such as within 30 seconds. With potassium persulfate and potassium metabisulfite, polymerization begins in 5-25 minutes depending on the initiator concentration. In certain examples, polymerization with potassium persulfate and potassium metabisulfite began within 6 minutes (0.15 wt %), 12 minutes (0.1 wt %), or 22 minutes (0.076 wt %). In some embodiments, the hydrogels were left in the molds for several hours to ensure complete polymerization.

The polymerized hydrogels then may be washed to remove any unreacted components. Washing the hydrogels may comprise soaking the hydrogels, such as with water, or more preferably, an ionic electrolyte solution comprising mobile ions. Soaking the hydrogel may result in gel swelling. In some embodiments, soaking the hydrogel in an electrolyte solution results in gel swelling that increases a surface area of the hydrogel by from greater than zero to about 5 times, and increases the thickness of the hydrogel by from about greater than zero to about 2 times. In contrast, soaking the hydrogel in water without an electrolyte present may increase the surface area of the hydrogel by from about 10 time to about 20 times or more, and/or increase the thickness of the hydrogen by as much as 5 times or more. Additionally, soaking the hydrogel in water, as opposed to an electrolyte solution, may result in the hydrogel becoming lumpy, rather than the smooth hydrogel that is produced by an electrolyte soak.

Suitable electrolytes include salt solutions. Exemplary salt solutions include, but are not limited to, chloride salts (e.g., 1 M NaCl, KCl, RbCl, CsCl, $MgCl_2$, $CaCl_2$, $SrCl_2$, $BaCl_2$), potassium salts (e.g., 1 M $K_2SO_3$, KHEPES (4-(2-hydroxyethyl)-1-piperazineethanesulfonic acid, potassium salt), $K_2$PIPES (piperazine-1,4-bis-2-ethanesulfonic acid, potassium salt), $KHCO_3$, $K_2CO_3$, $KC_2H_3O_2$, KBr, KI, $K_3PO_4$, $KH_2PO_4$, $K_2HPO_4$), sodium salts (1 M $Na_2SO_3$, NaHEPES, $Na_2$PIPES) and calcium salts (e.g., 1 M $Ca(C_2H_3O_2)_2$, $Ca(NO_3)_2$). In some embodiments, the electrolyte is a 0.5 M salt solution, e.g., 0.5 M $CaCl_2$, KCl, $KHCO_3$, $KH_2PO_4$, $K_2$PIPES. In certain embodiments, the electrolyte is 1 M $CaCl_2$, 0.5-1 M KCl, 0.5-1 M $KHCO_3$, 0.5-1 M $KH_2PO_4$, or 0.5-1 M $K_2$PIPES. In some embodiments, the electrolyte is a 0.5 M salt solution, e.g., 0.5 M $CaCl_2$, KCl, $KHCO_3$, $KH_2PO_4$, $K_2$PIPES. In certain embodiments, the electrolyte is 1 M $CaCl_2$, 0.5-1 M KCl, 0.5-1 M $KHCO_3$, 0.5-1 M $KH_2PO_4$, or 0.5-1 M $K_2$PIPES.

Additionally, or alternatively, the hydrogels may be washed in organic solvents and/or humectants. Suitable organic solvents and/or humectants may include, but are not limited to, ethylene glycol (such as 10-50% in water), glycerol (such as 10-70% in water), dimethyl sulfoxide (such as 10-50% in water), methanol (such as 10-50% in water), and/or ethanol (such as 10-50% in water).

Additionally, or alternatively, the hydrogels may be washed in a buffer solution. Suitable buffer solutions include, but are not limited to, 2,2-bis(hydroxymethyl)-2,2', 2"-nitrilotriethanol, for example at a concentration of 0.1-1M and/or at a pH of 5.6-7, or tris(hydroxymethyl)aminomethane, for example, at a concentration of 0.1-1M and/or at a pH of 7-8.5.

The pH of the hydrogels can be adjusted by addition of a suitable acid or base, such as hydrochloric acid or sodium hydroxide. A reasonable pH range is from 3 or less to 10 or more. A change in the pH of the hydrogel may lead to a change in swelling of the hydrogel.

To maximize conductivity, the hydrogels may be soaked in fresh electrolyte solution for a suitable time period of from greater than zero to several days, such as from 1 hour to 7 days, from 6 hours to 5 days or from 12 hours to 3 days. Prepared hydrogels may be stored between plastic sheets to prevent them from drying out. If a hydrogel has dried out, it may be regenerated by soaking again in an electrolyte solution.

The hydrogels are then exposed, in any order, to metal ions and to a fluorescent dye, nanoparticle, colorimetric tag, or combination thereof, that will produce a color change, swelling or de-swelling, electrical, and/or vibrational spectral change upon exposure to the transition metal ions. In some embodiments, the hydrogels are first exposed to metal ions and then exposed to a fluorescent dye, nanoparticle, colorimetric tag, or combination thereof. In alternative embodiments, the hydrogels are exposed to the fluorescent dye, nanoparticle, colorimetric tag, or combination thereof, first, and then exposed to the metal ions.

The hydrogels may be exposed to a solution comprising, or suspected of comprising, metal ions, such as transition metal ions. The metal ions in the solution may have a concentration of from greater than zero to 100 ppm or more, such as from greater than zero to 75 ppm, from 0.05 ppb (part per billion) to 65 ppm, from 0.05 ppb to 50 ppm, from 0.05 ppb to 25 ppm, from 0.01 ppm to 18 ppm, from 0.05 ppm to 117.9 ppm, or from 0.055 to 17.87 ppm. In particular embodiments, metal ions, such as iron, were detected in a solution having a metal ion concentration of from 0.0056 ppm to 5.6 ppm. In other embodiments, metal ions, such as copper, were detected in a solution having a metal ion concentration of from 0.0635 ppb to 63.5 ppm. In some embodiments, the measured hydrogel characteristic may have a linear response to the concentration of the metal ions in the solution.

In some embodiments, for example, in embodiments where colorimetric measurements may be useful, the solution has a range of from greater than zero to 10 ppm or more, such as from 0.05 ppm to 9 ppm, or from 0.055 ppm to 8.96 ppm. In alternative embodiments, for example, in embodiments where conductivity measurements may be useful, the solution has a range of from greater than zero to 12 ppm or more, such as from 0.05 ppm to 11.5 ppm, or from 0.05 ppm to 11.1 ppm.

The hydrogels may be exposed to the solution for an amount of time suitable for the metal ions to soak into the hydrogel. In some embodiments, the hydrogels are soaked in a solution of the metal ions for from greater than zero to 24 hours or more, such as from 1 minutes to 24 hours, from 1 hour to 18 hours, from 4 hours to 16 hours, or from 6 hours to 12 hours. In certain embodiments, the hydrogel is soaked in a solution of metal ions for from 8 hours to 12 hours.

In other embodiments, the hydrogels may be exposed to a solution of metal ions for from greater than zero to 1 week or more, such as from 12 hours to 5 days, or from 1 day to 3 days. The exposure may be intermittent. For example, a hydrogel may be located on a surface that is exposed to weather, such as, but not limited to, an outdoor sculpture, a bridge, building, ship or vehicle. Metal ions from the surface may be dissolved by rain and the hydrogel may be located such that it is exposed to the water containing the dissolved metal ions running down the surface. A person of ordinary skill in the art will appreciate that such exposure may be intermittent and dependent on weather conditions, and that the concentration of metal ions in the water at any point in time may be below an optimal concentration. Accordingly, the hydrogel may be exposed to weather, and/or exposed to rain water washing down a surface, for a longer time than if the hydrogel was soaked in a metal ion solution, for example, in a laboratory.

The hydrogels then may be contacted with a solution, or suspension, of the fluorescent dye, nanoparticle, colorimetric tag, or combination thereof. In some embodiments, the solution or suspension is substantially evenly distributed over a surface of the hydrogel and allowed to soak into the hydrogel for an amount of time suitable to allow a desired quantity of the fluorescent dye, nanoparticle, colorimetric tag, or combination thereof to permeate into the hydrogel. The amount of time may be from greater than zero to 24 hours or more, such as from 1 minute to 18 hours, from 5 minutes to 12 hours, from 30 minutes to 6 hours, or from 30 minutes to 3 hours.

In some embodiments, the fluorescent dye, nanoparticle, colorimetric tag, or combination thereof remains stable in the hydrogel for an amount of time of from greater than zero to 6 months or more, such as from 1 month to 6 months, or from 2 months to 4 months. If the hydrogel comprising the fluorescent dye, nanoparticle, colorimetric tag, or combination thereof, dries out, typically it is able to be rehydrated with substantially no change or damage to the gel or to the fluorescent dye, nanoparticle, colorimetric tag, or combination thereof.

V. Method of Using

The disclosed hydrogels may be used for any application where detecting and/or quantifying the presence of metal ions in water is useful. The hydrogels may be used for real-time continuous monitoring for metal ions. Color change and/or swelling/de-swelling can be monitored by a suitable technique, such as by visual inspection. Additionally, or alternatively, changes in electrical properties, such as conductivity and/or impedance, can be monitored substantially continuously, or intermittently, to detect and optionally quantify the presence of metal ions.

In other embodiments, the hydrogels may be used to detect and/or quantify the presence of metal ions in a non-continuous process, such as by providing a water sample and using the hydrogels to test for metal ions in the sample. The sample can be from any water source, such as, but not limited to, drinking water, well water, river water, water run-off or a waste water stream.

The hydrogels may be used for detecting corrosion of metal structures or a protective coating on a structure. Structures may include, without limitation, a building, a bridge, a ship, piece of art work, such as a sculpture or statue, or a vehicle. In such embodiments, the hydrogels may be placed on or adjacent to the structure or coating such that water from the structure or coating can run over the hydrogel. The hydrogel therefore is exposed to any metal ions carried by the water, and will result in a color change, swelling/de-swelling, and/or electrical conductivity change in the hydrogel.

In such embodiments, the hydrogel may be exposed to the metal ion and then exposed to the fluorescent dye, nanoparticle, colorimetric tag, or combination thereof. For example, the hydrogel may be placed on a surface for a period of time suitable for metal ions, if any, to be absorbed by the hydrogel. The hydrogel is then contacted with the fluorescent dye, nanoparticle, colorimetric tag, or combination thereof, to see if metal ions have, in fact, been absorbed. Alternatively, the hydrogels may be exposed to the fluorescent dye, nanoparticle, colorimetric tag, or combination thereof, before being exposed to the metal ion. In such embodiments, the fluorescent dye, nanoparticle, colorimetric tag, or combination thereof, may provide a continuous, or real time, monitoring that will indicate, such as by a color and/or electrical change, when metal ions are absorbed.

VI. Working Examples

Example 1

Hydrogel Synthesis

All chemicals for hydrogel synthesis were obtained from Sigma-Aldrich and solutions were made using deionized $H_2O$. AMPS-co-PAA hydrogels were synthesized from the sodium salts of 2-acrylamido-2-methylpropanesulfonic acid (AMPS; 50 wt % solution) and poly(acrylic acid) (PAA; average MW~5100, 50 wt % solution). N,N'-methylenebis (acrylamide) (MBA; 1 wt % solution) was used as the cross-linker and the polymerization was carried out via the potassium persulfate and metabisulfite redox initiator system (1 wt % solutions) with glycerol added as a humectant. Additional information concerning hydrogel synthesis can be found in England, A. H. and T. L. Clare, *Synthesis and Characterization of Flexible Hydrogel Electrodes for Electrochemical Impedance Measurements of Protective Coatings on Metal Sculptures. Electroanalysis*, 2014. 26(5): p. 1059-1067, and in U.S. patent application Ser. No. 14/896, 509, both of which are incorporated herein by reference in their entireties.

Once synthesized, the hydrogels were removed from their molds and allowed to equilibrate in dishes containing the desired electrolyte for two hours at minimum, and then the electrolyte was replaced with fresh solution and the hydrogels again equilibrated for two hours. This process also allowed for removal of unreacted monomers.

The various electrolytes used were sodium chloride (Fisher Chemical), cesium chloride (Amresco ultra pure), rubidium chloride (Alfa Aesar 99.9%) strontium, magnesium, potassium and calcium chloride (Sigma-Aldrich 99%) and were prepared in deionized $H_2O$ at a concentration of 10 mM with a pH of 4. The pH was adjusted with 1M hydrochloric acid as necessary, measured with an Oakton Ion 510 Series meter.

Example 2

Synthesis of Prussian Blue and Analogs in Hydrogels

All reagents were used as received without further purification. To prepare Prussian blue or one of the other transition metal ions complex analogs within the hydrogels, 3 cm×3 cm portions of the hydrogels, already equilibrated in electrolyte as described above, were placed into appropriately sized beakers. Then a μL-mL sized aliquot of the desired metal salt stock solution (depending on the desired final concentration) was added to the beaker, as well as the amount of deionized water needed to bring the total mL of the metal ion solution and water to 10 mL. 90 mL of 10 mM NaCl at pH 4 (unless otherwise noted) was added so that the total final volume in which the gels were soaked was 100 mL. The beakers were then covered and the gels soaked for 8-12 hours. The hydrogels were removed from the beakers, placed on glass, excess electrolyte wicked off, and a 375 μL aliquot of the appropriate hexacyanoferrate ion was pipetted evenly over the hydrogel forming a droplet that evenly covered the gels and allowed to rest for 30 min, which was a sufficient time for the entire droplet to be absorbed into the gel and for the complex to form. The concentration of the hexacyanoferrate ion was kept at approximately 1.25 times the stoichiometric equivalent needed to form the complex (i.e. the transition metal ions were the limiting reactant). It should be noted that one exception to this procedure were the gels in FIG. 2, which were soaked in a total final volume of 10 mL, rather than 100 mL.

The solutions of potassium ferricyanide (Acros Organics 99+%) or potassium ferrocyanide (J.T. Baker Chemical) were made with deionized $H_2O$, purged with nitrogen, and then stored in the dark. Solutions of iron ammonium sulfate (Sigma Aldrich 99%) were the source of $Fe^{2+}$ ions, while chloride salts of $Ni^{2+}$ (Mallinckrodt), $Mn^{2+}$ (Merck), $Cu^{2+}$ and $Co^{2+}$ (Alfa Aesar) were the sources of the other transition metal ions.

Example 3

Synthesis of Aqueous Solutions of Prussian Blue and Analogs

The color observations presented in FIG. 3 were prepared as follows. A 550 ppm solution of the respective metal salts were made and ferricyanide or ferrocyanide was added to be stoichiometrically equivalent. Color changes or the lack thereof were observed and recorded. Chloride salts of $Al^{3+}$, $Pb^{3+}$, $Ni^{2+}$ (Mallinckrodt), $Cd^{2+}$ (J.T Baker), $Zn^{2+}$ (Fisher Science Education), $Sn^{2+}$, $Mo^{5+}$, $Co^{2+}$, $Cu^{2+}$ (Alfa Aesar), $Zr^{2+}$, $Cr^{3+}$ (Sigma Aldrich), $Mn^{2+}$ (Merck) and an acetate salt of $Ag^+$ (Matheson Coleman+Bell 99.5%) were used as the sources of the metal ions.

Example 4

Colorimetric Analysis

Images were taken with a Nikon D3100 SLR camera in a custom lightbox with full spectrum lighting at f/10 with an ISO of 400. Any unreacted ferricyanide was removed from the gels by rinsing them in fresh electrolyte prior to photographing. ImageJ 1.50i software was used to obtain the average blue value and its standard deviation from each hydrogel's image area. The color value reported was obtained by subtracting the ImageJ blue value from 256 to obtain a positive slope in a calibration plot. Photographs shot in RAW format were compared to the ProPhoto RGB and sRGB equivalents and less than a 1% difference in the blue values throughout the entire concentration range was observed. JPEG files in sRGB color space were used for the final analysis.

Example 5

Impedance Spectroscopy

Impedance measurements over a frequency range of 1 MHz-0.1 Hz were completed using a Gamry REF600 with Echem Analyst software to process the data. The potential applied was 20 mV AC versus the open circuit potential. The gels were clamped between two silver plates (Alfa Aesar) acting as the counter and working electrodes, respectively, with a Teflon spacer to control the amount of pressure exerted on the hydrogel. Conductivity was calculated by choosing a frequency where the phase angle was zero, meaning the Bode plot was entirely resistive at that frequency. Typically, the frequency used was 20.02 kHz. The resistance value was normalized to the exact area of the gel by dividing by a calculated cell constant ($K_{cell}$), as shown in Equations 3 & 4.

$$K_{cell}=1/gel \quad (3)$$

$$\text{Normalized } R=R \quad (4)$$

$$\sigma=1/\rho \quad (5)$$

Figure 4:
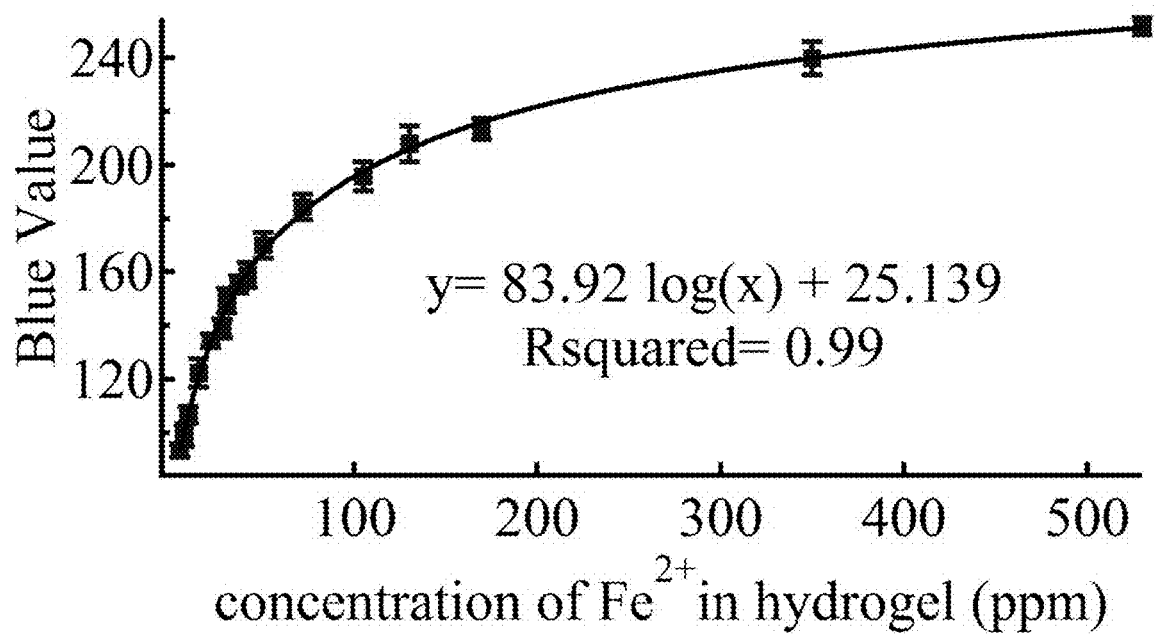
FIG. 4 is a graph of inverted blue values versus iron concentration, illustrating a calibration curve of average inverted blue values of hydrogels at various iron concentrations.
Figure 5:
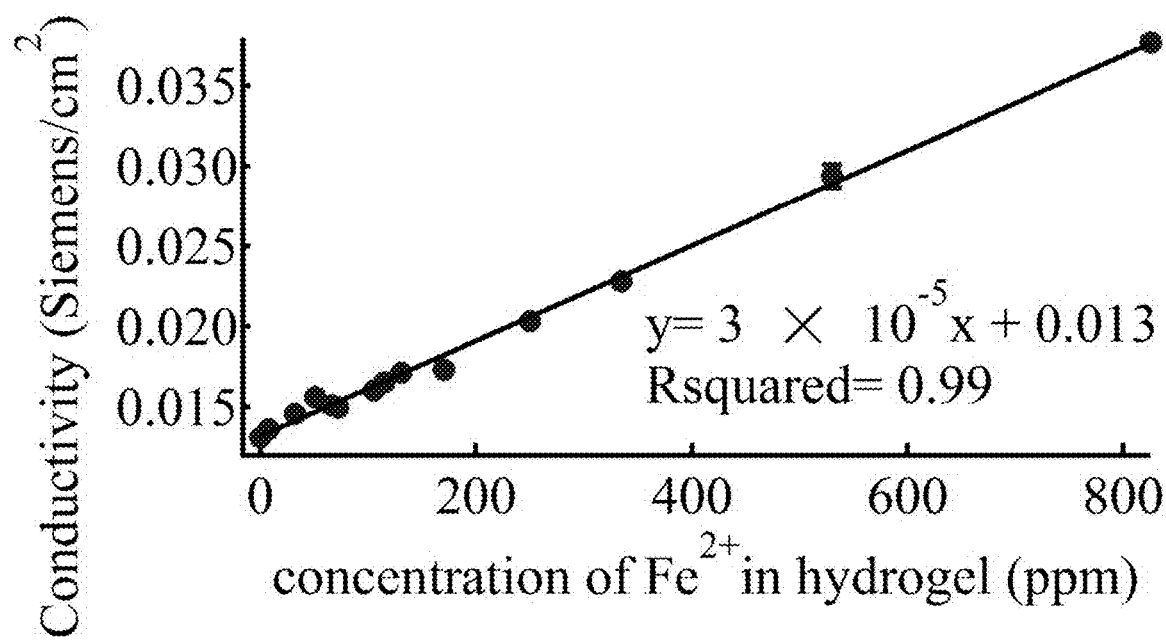
FIG. 5 is a graph of conductivity versus iron concentration, illustrating a calibration curve of $Fe^{2+}$ conductivity as detected by impedance measurements of Prussian blue integrated hydrogels.

Equation 5 was then used to convert resistance to conductivity. The data shown in FIGS. 4 and 5 is the result of three data sets, taken on different days and merged together.

Example 6

Swelling Characterization

Concentrations herein are presented as the final concentration within the hydrogel, reported in ppm. The volume of the hydrogels were calculated after uptake of the transition metal ions, inducing gel de-swelling. It was assumed that there was substantially 100% uptake of the ions from solution into the hydrogel. Gel volumes and swelling changes of the hydrogels were measured using manual Vernier calipers. It was determined that the average deviation in measured gel volume was 0.4 $mm^3$.

Example 7

Raman Spectroscopy

Raman measurements of hydrogels were carried out on a Horiba LabRAM HR Evolution spectrometer with a 532 nm Laser Quantum mpc6000 laser operating at 5 mW. The operating and analysis software used was LabSpec version 6. The confocal hole was set to 400 μm and a grating of the order 600 lines/mm was used. Spectra were collected using an auto-scanning mode with twenty accumulations. Hydrated hydrogels were studied using a 10× objective, while dried hydrogels were studied under a 50× objective. Hydrated hydrogels were encased in a humidity chamber composed of a petri dish covered with Mylar film. Raman peaks associated with water at 3000 $cm^{-1}$ were used in normalization to correct for any fluctuations in the hydration state of the gel. Dried hydrogels were dried within a humidity chamber, where the humidity was incrementally decreased over the course of a few days to allow for controlled shrinkage with minimal mechanical damage. Gels were then subjected to a final drying overnight in an oven set to 60° C.

Figure 6:
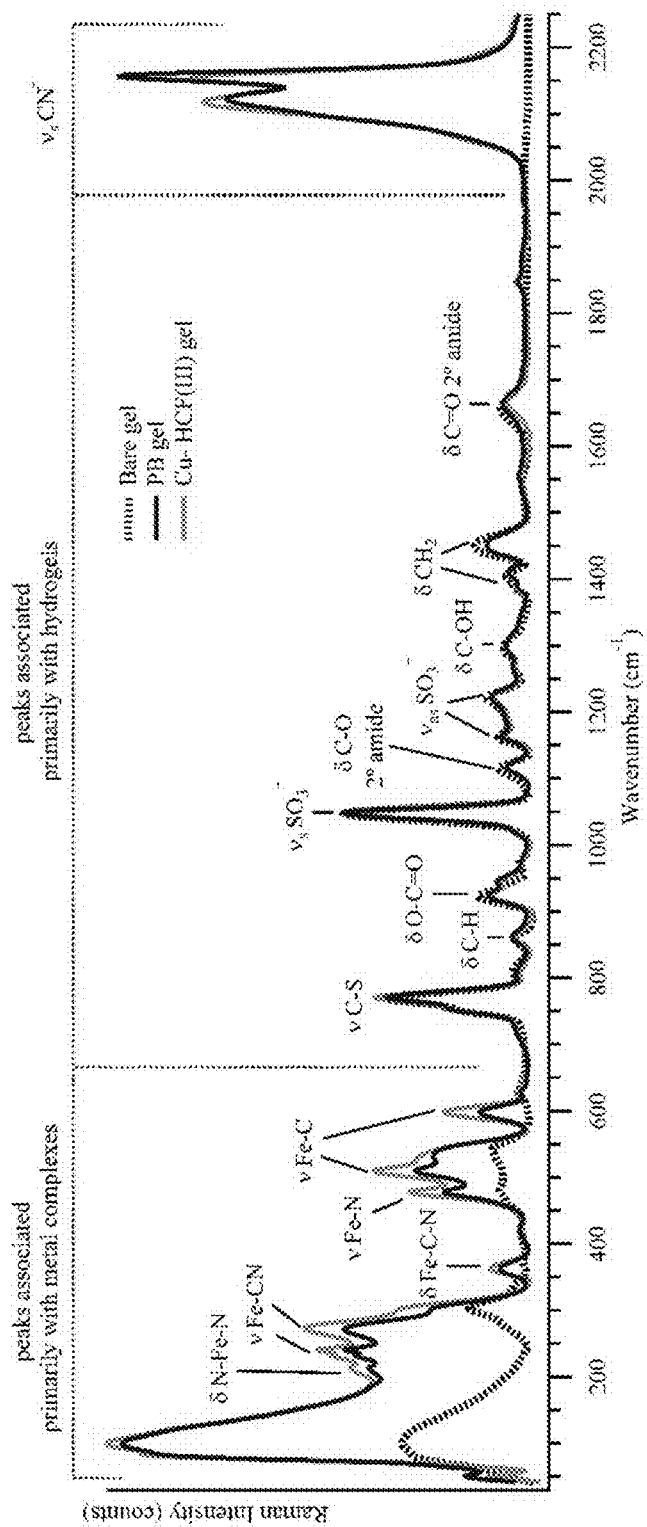
FIG. 6 is a Raman spectra of gels containing 1 mM Prussian blue and copper ferricyanide (Cu—Fe(III)Cy), respectively, and a gel without added complex, denoted as "Bare gel". Spectra are intensity normalized to the sulfonate peak at 1040 $cm^{-1}$.

The Raman spectra of gels containing Prussian blue (PB) or copper ferricyanide (Cu—Fe(III)Cy) were compared to that of a hydrogel containing only NaCl (Bare) to determine a number of characteristic peaks (FIG. 6). At 2114 and 2150 $cm^{-1}$ the strong symmetric stretches of cyanide groups were present only in the gel spectra of metal hexacyanoferrate complexes (MCF). Both peaks were shifted away from the typical free cyanide stretch of 2080 $cm^{-1}$, indicating a change in energy due to bonding to metal ions[1]. The mid wavenumber range of approximately 700-1800 $cm^{-1}$ contained peaks primarily originating from the hydrogel structure. In the low wavenumber range of approximately 50-650 $cm^{-1}$ there were a few relatively weaker intensity peaks in the bare gel, while in the MCF-containing hydrogels the same peaks were present, with the addition of characteristic MCF peaks as follows. The peaks at 506 and 595 cm$^{-1}$ were assigned to Fe—C stretches, the slightly lower wavenumber peak of 475 cm$^{-1}$ to a Fe—N stretch, the peak at 357 cm$^{-1}$ to bending of Fe—CN, and 208 cm$^{-1}$ to bending of N—Fe—N. It is possible that the heightened intensity of the peak at 96 cm$^{-1}$ was due to a bending peak of C—Fe—C in the gels contained MCF.

Figure 7:
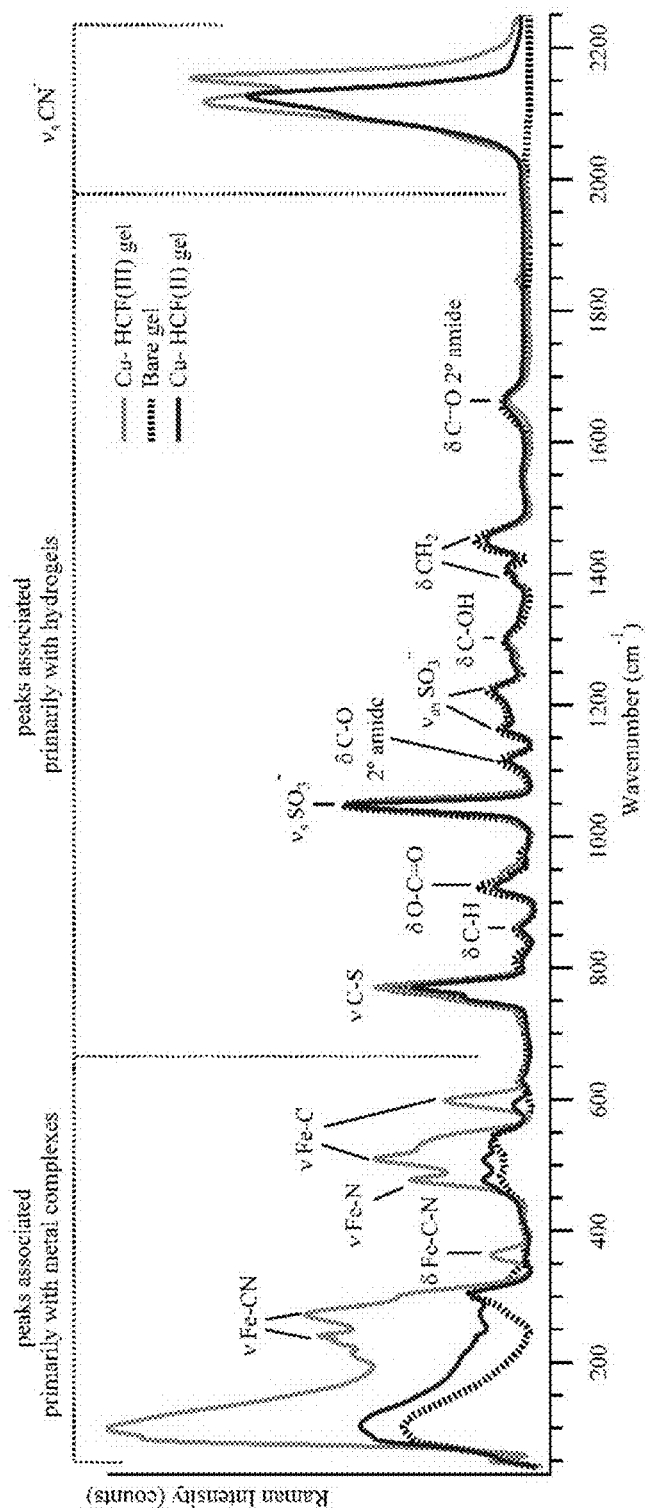
FIG. 7 is a Raman spectra of gels containing 1 mM copper ferricyanide (Cu—HCF(III)) and copper ferrocyanide (Cu—HCF(II)), respectively, and a gel without added complex, denoted as "Bare gel". Spectra are intensity normalized to the sulfonate peak at 1040 $cm^{-1}$.

Copper ions formed a dark red complex when reacted with ferrocyanide and a golden yellow complex when reacted with ferricyanide, as denoted in FIG. 3. In FIG. 7, the Raman spectra of the two species were compared to bare gel. Spectral intensity and wavenumber differences between the two complexes were seen primarily in the high energy region, although there was also a significant difference between the CN$^-$ peaks in the 2000-2200 cm$^{-1}$ region.

Example 8

UV-Vis Spectroscopy

UV-vis spectroscopy of the hydrogels was carried out on a Shimadzu UV-3600 spectrometer that utilized the software UVprobe version 2.33. The hydrogels were sandwiched between quartz windows and placed in a custom-made sample holder. A gel of the same electrolyte composition with no added transition metals was used as the blank reference sample. The spectra were collected from 400-1300 nanometers with a slit width of 2 nanometers.

Example 9

Results and Discussion

Figure 8:
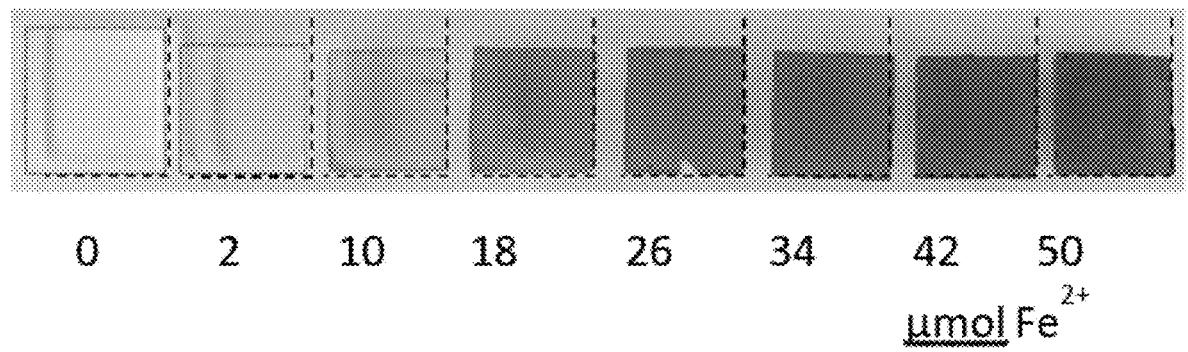
FIG. 8 is a digital image comparing the colorimetry of the same hydrogels with overlaid corner grids to demonstrate de-swelling of the hydrogels with concentration. Gels with 2 and 0 μM concentrations are outlined in red for clarity.

As shown in FIGS. 4, 5, and 8, increasing amounts of soluble iron (II) produced increasing amounts of Prussian blue within the hydrogels. Changes were observed and quantified visually (FIGS. 4 and 8) by the increasing saturation of blue color, and also by an increase in conductivity as measured using electrochemical impedance spectroscopy (EIS) (FIG. 5). The colorimetric response of the hydrogels produced a logarithmic response (FIG. 4). The lower limits of detection and quantitation for the colorimetric method were 0.10 & 0.15 ppm, respectively, with a dynamic range of 0.11-9 ppm. A UV-vis spectroscopy survey was also carried out on the PB-gels and the wavelength of the maximum absorbance remained constant at 712 nm and showed a similar logarithmic response to PB formation upon exposure to iron ions. The conductivity of the Prussian blue-hydrogel system (PB-gel) showed a linear response with lower limits of detection and quantitation of 0.07 & 0.23 ppm, respectively, and a dynamic range of 0.11-11.1 ppm (in the solution). The upper limit of the dynamic range for the conductivity measurements is theoretically only curtailed by the number of ion-binding functional groups present in the hydrogel; the calculated upper limit of ion uptake in the 3 cm×3 cm gels used here (the gels can be cut to any size) was 1425 ppm Fe$^{2+}$ in the hydrogel (corresponding to 17.9 ppm in the solution). This upper limit of quantification can be increased by increasing the w/w % of sulfonate monomer during synthesis of the hydrogels. In a test the w/w % of sulfonate groups in the gels was increased by 10%, which increased the upper limit to approximately 2050 ppm in the hydrogel (22.3 ppm in the solution).

There are specific advantages to each method beyond their individual quantitative responses: the colorimetric response allows for rapid visual confirmation of the presence of iron ions, while conductivity measurements offer more robust quantitation, as it has a linear response, and may be more suitable for in-situ field measurements, where variable lighting conditions may challenge the colorimetric determination. Both techniques can be considered non-destructive (with the electrical method being so because the applied voltage is AC and low in amplitude). The hydrogel itself plays an important role in this sensor system, as it is anionic and thus collects and concentrates the transition metal cations. In FIGS. 4, 5, and 8, the final concentrations of Fe$^{2+}$ in the hydrogels were 100× higher than the initial concentration in the respective soaking solutions. Gel concentration increased the colorimetric sensitivity (based on the slope of the calibration curves) that was seen in the gel colorimetric sensor versus solution, and a 60% increase in sensitivity for the conductivity sensor for the low to mid-range values (0-170 ppm).

Copper ions (and nine additional transition metal ions, as given in FIG. 3) were also detected with the same techniques, this time forming a copper hexacyanoferrate (Cu—HCF(III)) complex within the hydrogel. The range of concentration detected was 0.11-3 ppm in the initial solution with a detection limit of 0.11 ppm Cu$^{2+}$. In this instance, the conductance of the system decreased as the concentration of copper ions increased, the converse of iron ions.

Figure 9:
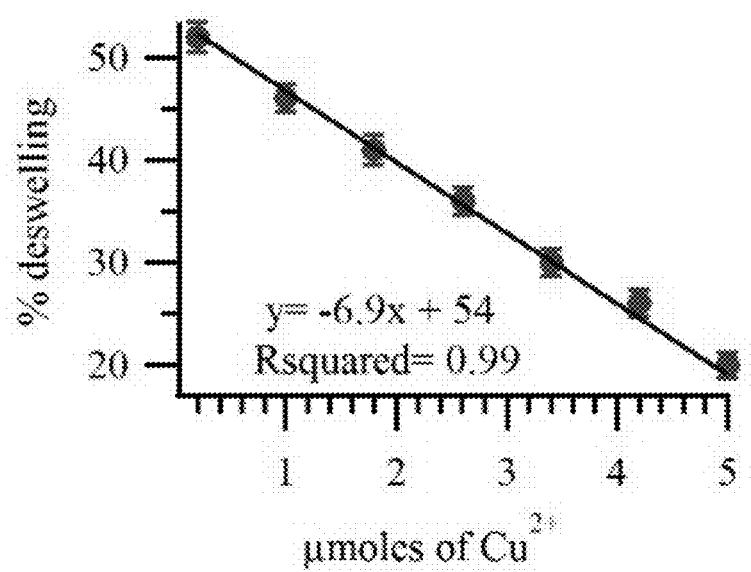
FIG. 9 is a graph of percentage de-swelling verses μmoles of $Cu^{2+}$, illustrating a calibration curve of $Cu^{2+}$ as detected by measurement of the de-swelling of Cu—HCF integrated hydrogels.

Additional characterization of the responses of these sensors to iron and copper ions reinforced the opposing conductance trends observed. Specifically, it was observed that uptake of metal ions into the hydrogels caused the gel to either swell or shrink (de-swell) by varying amounts depending on the type and amounts of transition metal ions. The swelling/de-swelling phenomena, which followed a quantifiable trend (as can be seen in FIG. 9 for Cu—HCF(III)), provide another sensing parameter. The swelling behavior for Prussian blue, while also quantifiable, showed the opposite trend: increases de-swelling (i.e. shrinkage) with increasing PB in the hydrogel. Rationale for those trends is provided by close examination of peak positions in Raman spectra.

Figure 10:
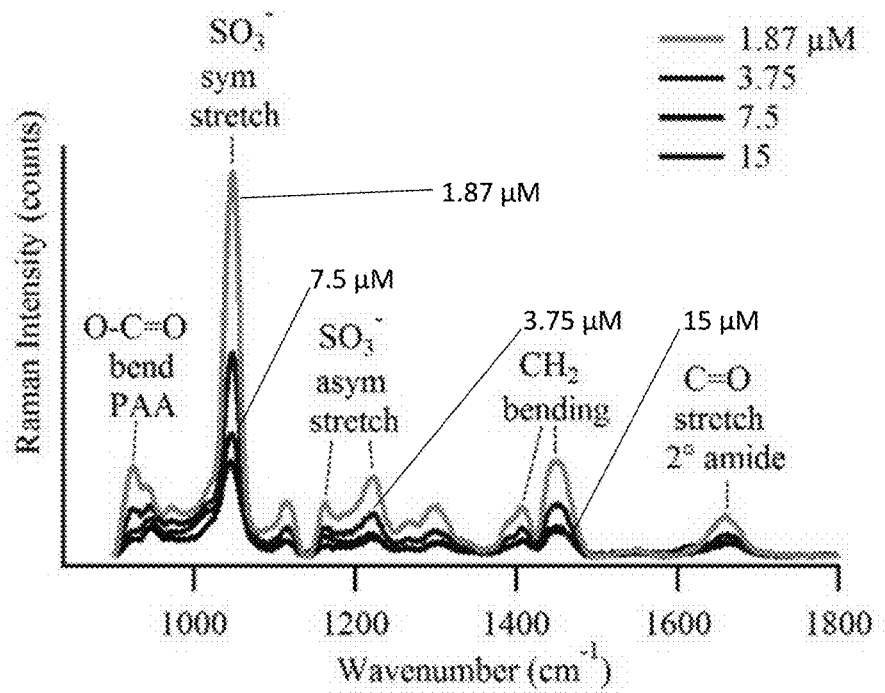
FIG. 10 is a graph of Raman intensity versus wavenumber, illustrating the decreasing Raman peak intensities with increasing Prussian blue concentration within the hydrogel. The peaks with the greatest intensities are labelled for reference.

Prussian blue formed within hydrogels was also quantitatively detected via infrared and Raman spectroscopy. The mid-range wavenumbers (from 900 cm$^{-1}$ to 1800 cm$^{-1}$), associated with hydrogen bonding, decreased in intensity with increasing concentration of PB within the hydrogel, as can be seen in the Raman spectra in FIG. 10. As would be expected from the conductivity measurements trends, Cu—HCF(III) hydrogels displayed the converse Raman trend, as copper ions affected H-bonding differently from iron ions.

Figure 11:
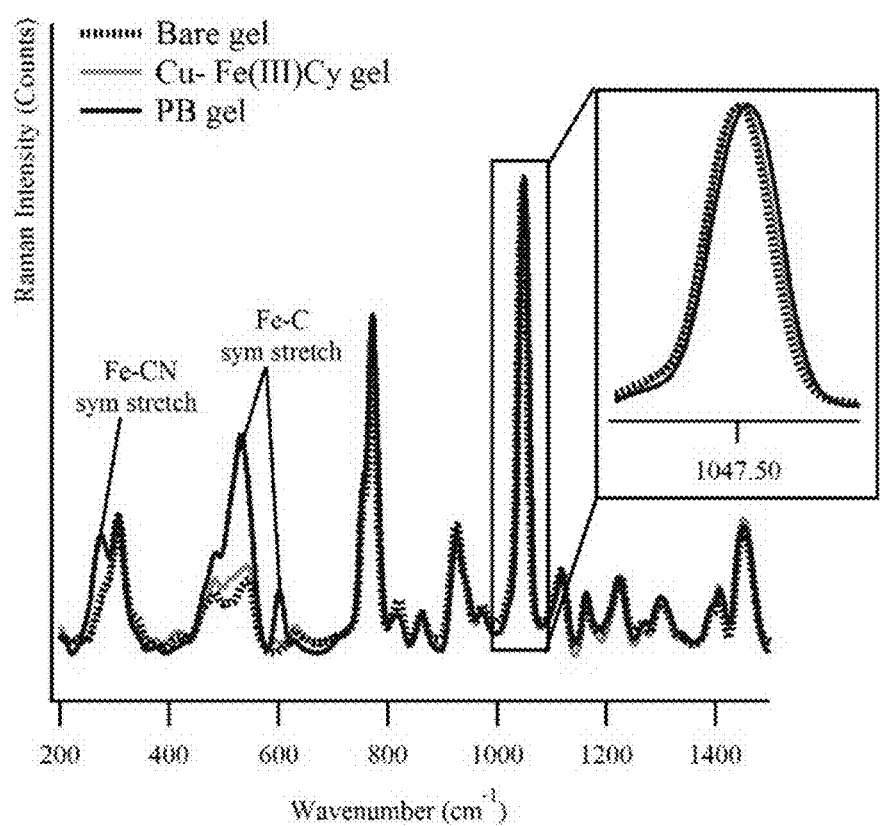
FIG. 11 is a graph of Raman intensity verses wavenumber, illustrating low to mid wavenumber portion of Raman spectra of gels containing Prussian blue and Cu—HCF, respectively, and a gel without added complex, denoted as "Bare gel". The inset shows a magnified view of the AMPS $SO_3^-$ symmetric stretch for all three hydrogels. Spectra are intensity normalized to the sulfonate peak.

Direct evidence of the metal complex interacting with the hydrogel matrix was seen by comparing the hydrogel Raman spectrum with the Cu—HCF(III) hydrogel and bare hydrogel (see FIG. 11). At the lower wavenumbers (from 200 cm$^{-1}$ to 700 cm$^{-1}$), unique symmetric stretching peaks attributed to Fe—CN and Fe—C bonds were present only in the Prussian blue gel. As shown in the inset of FIG. 11, the SO$_3^-$ symmetric stretch (from the AMPS molecule) showed slight peak position shifts, reflecting the different ion types interacting with the charged headgroup. The bare hydrogel with only electrolyte (NaCl) present has\d a SO$_3^-$ peak at 1047 cm$^{-1}$, while Cu—HCF(III)-gel showed a slight shift to 1048 cm$^{-1}$ and the PB-gel had its maximum at 1051 cm$^{-1}$. The shift of 4 cm$^{-1}$ for PB-gel versus 1 cm$^{-1}$ in the case of Cu—HCF(III) gel compared to bare gel, indicated a stronger interaction between the Fe$^{2+}$ and SO$_3^-$ than Cu$^{2+}$ and SO$_3^-$. Characteristic strong CN$^-$ symmetric stretches were present in the Raman spectral for both PB-gel and Cu—HCF(III) gels (FIG. 6).

Ferrous iron ions, when compared to cupric ions, are expected to have a stronger interaction with the sulfonate group, based on ion size and charge density differences. Thus, without being bound to a particular theory, the opposite conductivity and swelling trends seen for PB and Cu—HCF(III) gels may be explained by the differing strengths of association. Because iron ions within the PB complex strongly interact with $SO_3^-$ headgroups, co-ions originally associated with those headgroups for charge balance were dislodged and experience greater mobility, reducing the electrolyte viscosity and increasing the conductivity of the hydrogel, as presented in FIGS. 4, 5, and 8. In contrast, possibly because $Cu^{2+}$ does not associate as strongly with the sulfonate headgroup, conductivity of the hydrogel decreased as free $Cu^{2+}$ was converted into the neutral Cu—HCF(III) complex.

De-swelling trends were similarly explained by considering the strength of transition metal ion interactions with the hydrogel matrix, where stronger interactions correlate with more de-solvation of the interacting ions. The strong interaction of $Fe^{2+}$ (and therefore Prussian blue) with the hydrogel headgroups caused an increase in the degree of "ionic cross-linking" in these highly charged, anionic hydrogels. In the case of Cu—HCF(III)-gels, while there was some de-swelling of the hydrogel due to neutralization of charge upon formation of the neutral complex, the ratio of the hydrated radii of Cu—HCF(III) and the original headgroup co-ions present, may be the driving influences of the overall increase in swelling trend seen in FIG. 9. It was presumed that the hydrated radius of the Cu—HCF(III) is larger than individual electrolyte ions. Therefore, when the ratio of Cu—HCF(III) to electrolyte ions was greater than one, the amount of deswelling decreased.

When $Ni^{2+}$ and $Mn^{2+}$ hexacyanoferrate complexes were formed in the hydrogel, they followed the conductivity and de-swelling trends of Cu—HCF(III) and Prussian blue, respectively. Without being bound to a particular theory, this may be due to the radius of $Ni^{2+}$ relating more closely to $Cu^{2+}$ and that of $Mn^{2+}$ to $Fe^{2+}$, and their behavior offer further evidence that these trends are driven by gel headgroup preference via ionic radius and charge density.

Figure 12:
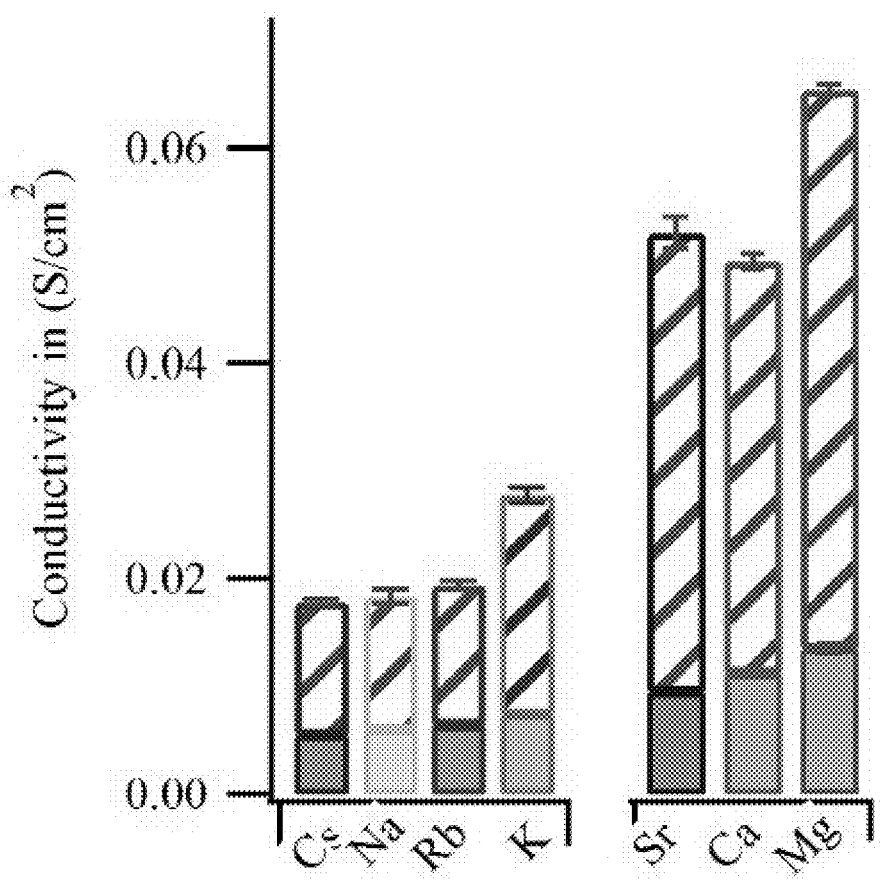
FIG. 12 is a graph of conductivity versus metal ions, illustrating the conductivities of hydrogels equilibrated in various chloride electrolytes. Solid bars indicate conductivities of gels with only electrolyte; the patterned bars indicate the conductivities of the gels with Prussian blue formed within the hydrogel.

In order to provide more evidence for the hypothesis of the ion-headgroup interaction driving the swelling and conductivity trends seen in FIGS. 4, 5, and 8, hydrogels were equilibrated in chloride-based electrolytes with varying mono- and divalent counter-cations ($Na^+$, $K^+$, $Cs^+$, $Rb^+$ and $Ca^{2+}$, $Sr^{2+}$, $Mg^{2+}$). Hydrogels showed conductivity differences based on cation size and affinity for the gel's headgroups. The gels with various monovalent cations showed the following conductivity trend: $K^+>Rb^+>Na^+>Cs^+$. When $Fe^{2+}$ was then equilibrated into those various hydrogels, conductivities of the gels increased to a similar value, an average of $32\pm4$ µSiemens. Once ferricyanide was added and Prussian blue formed, the conductivities of the hydrogels increased again to follow the same original trend: $K^+>Rb^+>Na^+>Cs^+$, as can be seen in FIG. 12. $K^+$ as an electrolyte showed a particularly large increase in conductivity after the formation of Prussian blue. It is known that Prussian blue formed in the presence of $K^+$ ions is considered to be a water soluble form of Prussian blue, where $K^+$ ions occupy interstitial spaces in the lattice framework. These $K^+$ ions acted as a charge balance, and as such the stoichiometry of the complex changed from $Fe(III)_4[Fe(II)(CN)_6]_3$ to $K_4Fe(II)_4[Fe(II)(CN)_6]_3$. This change in structure likely contributed to the extra increase in conductivity seen in FIG. 12. Divalent cations were observed to have an increase of roughly double the conductivity versus the monovalent ions, as would be expected. $Mg^{2+}$ was expected to have the least affinity for the AMPS groups and indeed it had the highest conductivity, while $Ca^{2+}$ and $Sr^{2+}$ had lower conductivities. Finally, it is notable that when the calculated gel uptake capacity was surpassed with a high concentration of $Fe^{2+}$, the trends described above were not observed. In that case it was the excess iron ions that dominated conductivity of the hydrogel. For the same reasons, if the electrolyte salt concentration was increased above the uptake capacity, the trends again were not visible.

Figure 2:
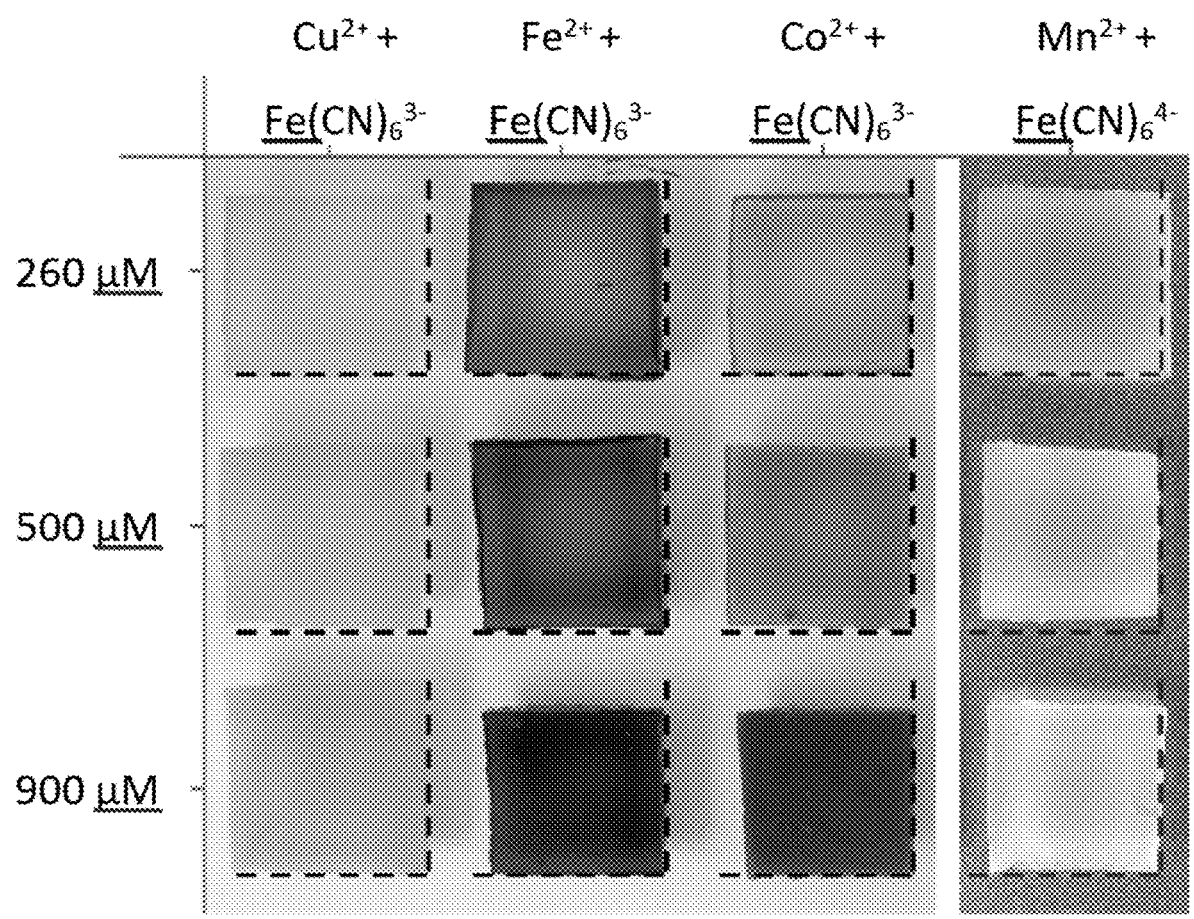
FIG. 2 is a digital image of 3×3 cm hydrogels exposed to various transition metal ions that produce different colored complexes upon addition of hexacyanoferrate.

Many different metal hexacyanoferrate complexes were formed within the hydrogels. Exemplary complexes that display unique colorimetric and swelling changes are shown in FIG. 2. With respect to FIG. 2, swelling/de-swelling changes were seen with varying concentration, with dashed lines corresponding exactly to 3×3 cm provided for reference. Hydrogels with manganese ions are shown on a gray background to increase contrast. A list of the colors seen for metal hexacyanoferrate complexes formed is provided in FIG. 3. These results suggested that combining the observed spectral changes with conductivity measurements will provide both quantitation, and the ability to differentiate transition metal species in a mixture of analytes.

Example 10

Quantitative Photonic and Impedimetric Responses of Hydrogel-Based Sensors for the In-Situ Evaluation of Corrosion Inhibitors on Steel I. Introduction In 2016, the National Association of Corrosion Engineers (NACE) estimated the worldwide cost of corrosion to be $2.5 trillion U.S. dollars, or 3.4% of the global GD. To reduce corrosion costs, NACE encouraged the implementation of corrosion management systems along with advanced anti-corrosion technology. One strategy to address those goals would be the ability to sense preliminary stages of corrosion, which would inform and direct treatment decisions while reducing corrosion costs by an estimated 30%. Electrochemical and advanced spectroscopic techniques are methods currently used for corrosion sensing. However, those techniques are not widely used in-situ, because they are difficult to adapt for field use and for areas with limited maneuverability. Furthermore, such techniques are often expensive, require a great deal of interpretation and training to use, and only detect the later stages of corrosion. There exists a need for inexpensive, robust, non-destructive and easily understandable corrosion-detection methodologies that can quantify the initial markers of corrosion.

Hydrogels offer the possibility of capturing markers of early corrosion (i.e. soluble transition metal ions) and facilitating their detection through a variety of chemical and physical responses to their presence within the gel material. The usefulness of hydrogels as sensors stems from their integrative ability to bind and concentrate analytes of interest, while also acting as a transducer by converting external stimuli into measurable signals. The flexibility and conformability of hydrogels, as well as their self-containing, encapsulatory nature, greatly increases their utility compared to inflexible and solution-based sensors and actuators. Hydrogel composition can be varied by changing the headgroup identity or by altering the monomer and/or crosslinker ratios, resulting in tailored chemical and mechanical properties towards a specific analyte or sensor setup. Of particular interest here is the demonstrated affinity of some hydrogels for transition metal ions. It has been shown that hydrogels composed of polyacrylic acid (PAA) co-polymerized with acrylamido-methyl propane sulfonic acid (AMPS) produced multi-sensory responses to solutions of transition metal ions. It is postulated that transition metal ions from the surface of a metal substrate could be similarly incorporated into a contacting hydrogel, and that the quantifiable spectroelectrochemical signal responses produced would indicate the quantity of corrosion products. The quantifiable responses would have useful applications in developing anti-corrosion treatment protocols and methods, such as comparison and evaluation of coatings and inhibitor performance.

The covalently bound polymer network of the hydrogels studied in this disclosure allows for their equilibration in various solvents and electrolyte species, which permits electrostatic interactions with chemical marker(s) and may amplify the hydrogel's responses to such chemical stimuli. And, these hydrogels can bind transition metal ions, that, when reacted with hexacyanoferrate ions, $[Fe^{II}(CN)_6]^{4-}$ or $[Fe^{III}(CN)_6]^{3-}$, form complexes in the hydrogel having the general structure $M^{x+}[Fe(CN)_6]^{y-}_{x/y}$, where M=transition metal, which alter the electrical, spectral and/or mechanical properties of the material in measurable ways. Iron hexacyanoferrate complexes, or Prussian blue (PB) are two suitable hexacyanoferrate complexes that can be formed, but many transition metals form similar complexes (e.g. $Cu^{2+}$, $Ti^{4+}$, $Cr^{3+}$, $Sn^{4+}$, $Al^{3+}$, $Mn^{2+}$, $Zn^{2+}$, $Co^{2+}$, $Ni^{2+}$, $Pd^{2+}$, $In^{3+}$, $Ga^{2+}$, $Y^{3+}$, $Zr^{4+}$, $Ag^+$, $Cd^{2+}$, $La^{3+}$, $Pb^{2+}$, $Pt^{2+}$, and $Bi^{3+}$) offering the potential for many different ion-specific sensors.

While in the past, heavy metals (e.g. chromates and molybdates) or other inorganic oxides (e.g. phosphates and nitrates) were used as corrosion inhibitors, more environmentally-benign alternatives are finding greater usage, such as saturated fatty acids, for example, carboxylic acids with methyl-terminated hydrocarbon chains of varying length. While specific studies of methyl-terminated fatty acids on steel are limited, it is possible to look at related studies for an understanding of the fundamental trends. As the chain length of fatty acids increase, the aliphatic tails experience greater intermolecular forces, which allows for a greater degree of order, crystallinity, and self-assembly than shorter chain lengths. These increased intermolecular forces reduce the intermolecular distance at the interface, producing greater packing densities, as well as fewer gauche conformational defects, yielding a greater protective quality against corrosion.

Here, the effectiveness of saturated fatty acid corrosion inhibitors of a range of carbon chain lengths (i.e. formic, butyric, hexanoic, decanoic, myristic, stearic, arachidic and behenic) were studied in order to compare and contrast the disclosed sensing methodologies with established methods. Comparing the colorimetric response of hydrogels to their impedimetric response provides greater insight to the behavior of transition metal ions within and, together with X-ray photoelectron spectroscopy, provides information concerning the mechanism of action and the relative effectiveness of the fatty acid corrosion inhibitors studied. This demonstrated that hydrogels can be useful for evaluating the efficacy of different corrosion inhibitors, using a simple, quantitative colorimetric readout that detects that earliest stages of corrosion.

II. Methods

A. Synthesis of Hydrogels

Hydrogels were synthesized via the method disclosed herein, using the sodium salts of 2-acrylamido-2-methylpropanesulfonic acid (AMPS; 50 wt % solution) and poly(acrylic acid) (PAA; average MW~5100, 50 wt % solution) as the co-monomers, with N,N'-methylenebis(acrylamide) (MBA; 1 wt % solution) as the cross-linker. Polymerization occurred via free radical reactions with potassium persulfate and metabisulfite as the initiators. Glycerol was used as a humectant. All chemicals were purchased from Sigma-Aldrich and used without further purification.

The hydrogels typically polymerized within an hour. They were then removed from their molds and allowed to equilibrate with the chosen supporting electrolyte or buffer for at least two hours, a process that also removed unreacted monomers and allowed for greater homogeneity in the gel. The electrolyte or buffer was then replaced with a new aliquot of solution and the hydrogels were again equilibrated for two hours. The thickness of the hydrogel after this process was typically 3.0±0.2 mm.

The primary buffer used in this work was a 0.1 M tris buffer, (Tris(hydroxymethyl)aminomethane, VWR Ultra Pure Grade) at a pH of 7. The pH was measured using an Oakton Ion 510 Series meter and was adjusted using 1 M hydrochloric acid as necessary.

B. Preparation of Steel Plates

SAE 1008/1010 3"×6" steel panels were purchased from Q-Labs (chemical composition 0.60% max Manganese, 0.15% max Carbon, 0.030% max Phosphorus, 0.035% max Sulfur). Preparation of the panels began by soaking them in xylenes for approximately an hour to remove any non-polar contaminants from the surface. They were then removed from the xylene bath, wiped with a clean lint-free cloth and placed into a bath of isopropanol for approximately 20 minutes to solubilize the xylenes. The plates were then sanded with 320, 400, 600, 800 and 1000 grit wet/dry sandpaper (McMaster-Carr), alternating directions, until a smooth, reflective surface was obtained. Afterwards the plates were immediately sonicated (Bransonic PC-620) in isopropanol to remove any leftover sanding grit. The sonication process continued until a white, clean lint-free cloth soaked in isopropanol showed no signs of discoloration when wiped across the plate. The plates were then dried with nitrogen and treated with corrosion inhibitors as soon as possible (no more than two hours elapsed between preparation and treatment).

C. Treatment of Steel Plates with Corrosion Inhibitors

Seven fatty acids were tested for use as corrosion inhibitors in this study: butyric, hexanoic, decanoic, myristic, stearic, arachidic and behenic acid, all obtained from TCI America at 98% purity or higher. Butyric, hexanoic, decanoic, myristic and stearic acid were dissolved in 95% ethanol to make a 10 mM solution. Arachidic and behenic were dissolved at the same concentration in a 4:1 mix of 95% ethanol and chloroform. Stearic acid was also dissolved in this same 4:1 mix and re-analyzed to compare the results to the prior stearic acid in ethanol alone.

Freshly prepped steel plates were placed in glass Pyrex dishes and covered with freshly prepared fatty acid solution. Nitrogen was bubbled through the solution for approximately 20 minutes, then the solution was covered and left for 24 hours. At the 24 hour mark the plates were removed and sonicated in ethanol for five minutes to remove any solely physisorbed molecules. The plates were then removed, dried with nitrogen and any desired analysis was performed immediately. Three other treatments were used as a control: freshly sanded plates with no other treatment; plates soaked in 95% ethanol; and plates soaked in 10 mM formic acid.

The plates analyzed with X-ray photoelectron spectroscopy (XPS) were prepared in similar fashion, but with semiconductor grade solvents and while minimizing the exposure of the plates to air to avoid the buildup of superfluous adventitious carbon.

D. Colorimetric Analysis of Corrosion Inhibitors

The equilibrated hydrogels were cut into 3 cm×4 cm pieces, then a small aliquot of 15 mM potassium ferricyanide (Acros Organics 99+%) was pipetted evenly across the surface and allowed to equilibrate for 30 minutes. Once the 30 minutes were completed, three hydrogels were placed on each steel plate and the plate was then placed in a photography light box (ESDDI 32"×32" with 85W E27 daylight fluorescent light bulbs). A camera was custom white-balanced to the light conditions with a Munsell X-rite Card and images were taken with f/10 with $\frac{1}{15}$ second exposure and an ISO of 200. Images were taken at 0, 15, 30, 45, 60 and 75 minutes.

The images taken at 60 minutes were chosen for analysis, as there was not a significant increase in the amount of Prussian blue seen after this time point. "Blank" gels, with the ferricyanide, but with a sheet of Mylar forming a barrier between the hydrogel and the steel plate, were also photographed. All the images were color-balanced to the Munsell X-rite Card and straightened in Adobe Lightroom, version 2015.7. They were then imported into ImageJ 1.50i and the RGB threshold color set to the average+6× standard deviation of the control gels. The histogram values were obtained through ImageJ's particle analysis macro. The histogram values were converted to $Fe^{2+}$ quantities through a previously obtained calibration plot, which was adjusted for differences in background values.

E. Electrochemical Impedance Spectroscopy

Measurements were made using a Gamry 600 reference potentiostat with Echem Analyst software. Spectra were run from 1 MHz-0.1 Hz with 20 mV applied AC potential versus the open circuit potential. Hydrogels soaked in tris buffer (described above) and cut to 3 cm×3 cm were used as a solid electrolyte. Silver foil pieces were used as the counter and working electrodes, with PDMS spacers to control the hydrogel area. Hydrogel dimensions were measured using manual calipers and the exact surface area used for normalization. The spectra were fit to equivalent electrical circuits (EECs) for interpretation.

F. X-Ray Photoelectron Spectroscopy

X-ray photoelectron spectroscopy was performed using a Phi VersaProbe II instrument with a 200 μm beam, coupled with MultiPak software. High-resolution spectra were collected at a pass energy of 23.5 eV with 0.025 eV step resolution and a time of 0.8 seconds per step, while survey quality spectra were collected with a pass energy of 187.85 eV with 1.6 eV step resolution.

Peak fitting was performed with phi MultiPak software, version 9.5.0.8. An iterated-Shirley background with Gaussian-Lorentzian peak fits were used. Trends in the relative peak areas were interpreted utilizing established understanding of attenuation of photoelectrons with increasing carbon chain length.

III. Results and Discussion

Figure 13:
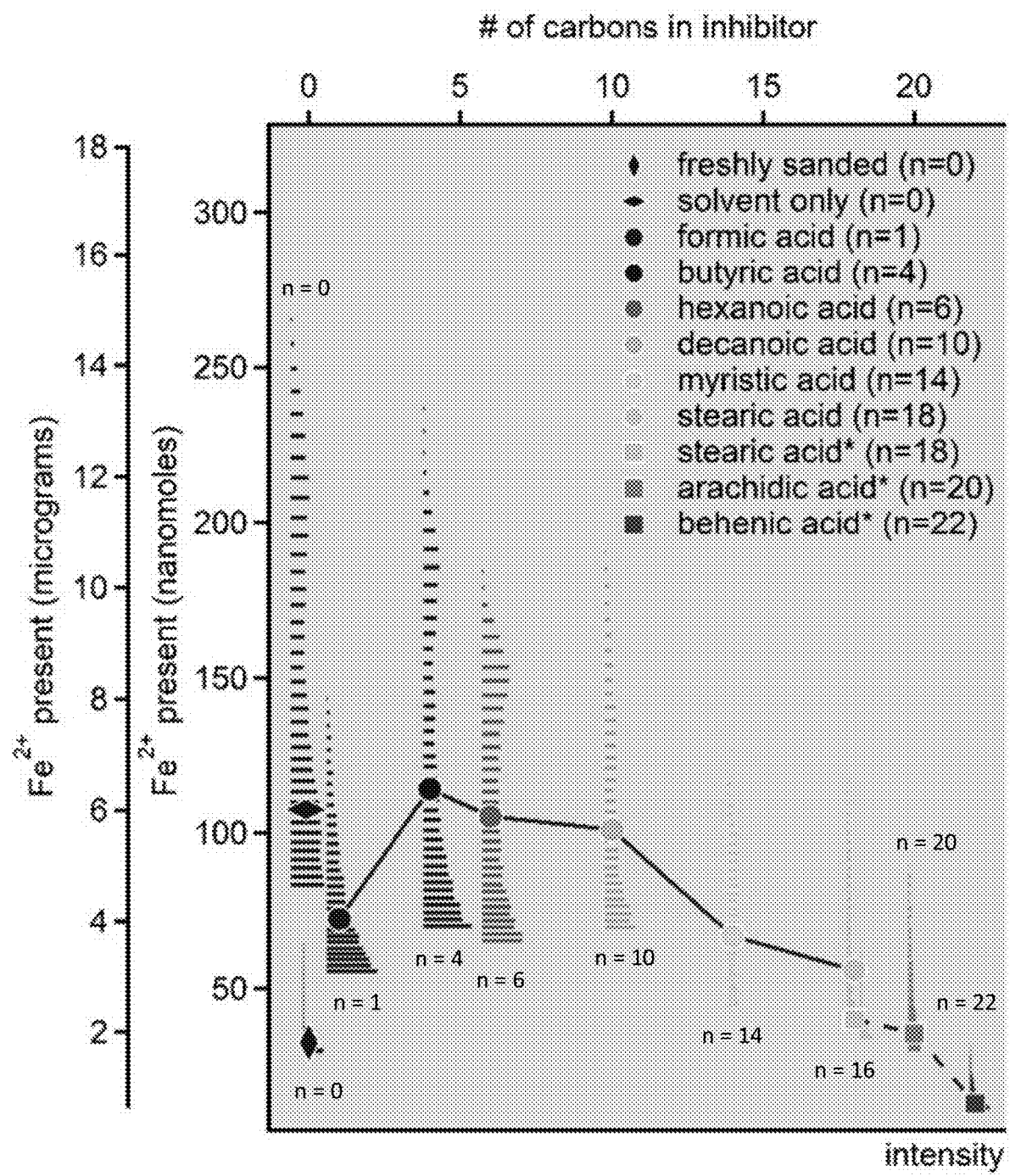
FIG. 13 is a graph of amount of $Fe^{2+}$ versus intensity, illustrating amounts of $Fe^{2+}$ ions that were detected by the hydrogel sensors based on the calibrated colorimetric response for each of the inhibitors evaluated.

Formation of Prussian blue within hydrogel sensors demonstrated the evolution of soluble iron species from steel substrates, an indicator of corrosion. The substrates, treated with different chain lengths of fatty acids, showed discernible trends in the quantitative amount of Prussian blue formed within the hydrogel sensors, as shown in FIG. 13. FIG. 13 provides a heat map of nanomoles of $Fe^{2+}$ detected based on the calibrated colorimetric response for each of the inhibitors evaluated, where n is the number of carbons in the inhibitor. Two controls were utilized with "solvent only" referring to a plate soaked in ethanol without inhibitor, while "freshly sanded" refers to a plate tested immediately after sanding. The solid line represents the average nanomoles of $Fe^{2+}$ detected on substrates that had been prepared using corrosion inhibitor dissolved in ethanol alone, while the dashed line and squares indicate the same except the inhibitors were dissolved in a 4:1 mixture of ethanol and chloroform (required for solubility reasons), also indicated by asterisks in the legend. The horizontal diamond marker indicates the average for 'solvent' and the vertical diamond marker indicates the average for 'freshly sanded'.

Figure 14:
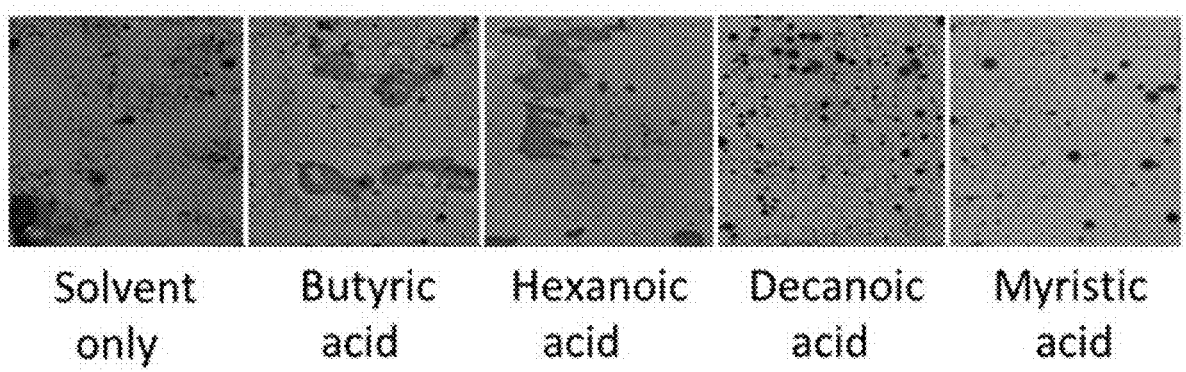
FIG. 14 is a digital image showing the range of Prussian blue formation behavior.

The images in FIG. 14 show the sensors in situ. Hydrogels containing ferricyanide were placed on steel substrates treated with a range of corrosion inhibitors. The spots of Prussian blue that formed varied in their blue tone and size. To capture the distribution of the responses on each sensor, blue values of each spot were measured, compared to calibrated Prussian blue hydrogels, and the results were plotted in FIG. 13. The histograms in FIG. 13 show that the range and average amount of $Fe^{2+}$ present. It was generally observed that for the plates treated with the longer chain fatty acids (>10 carbons), the gels had formed smaller, more localized spots of Prussian blue, in shapes with greater circularity (for example, myristic acid n=14), while the shorter fatty-acid chains (approximately 0-6 carbons) formed Prussian blue in larger, irregular areas across the entire region of the sensor (for example, butyric acid, n=4), as can be seen in FIG. 14. Considering the pKa values of the different acidic headgroups may aid in interpreting the singular exception to the overall trend, which was seen in formic acid-treated plates. Without being bound to a particular theory, formic acid, having a pKa of 3.75 which is lower than the other acids (that range between 4.5-5), and given its greater acidity, may have led to increased corrosion, thereby producing insoluble iron species. That hypothesis was supported by visual inspection, which revealed orange corrosion products on the formic acid-treated plate (which were not present on any of the other inhibitor-treated plates).

Without being bound to a particular theory, the overall trend of improved corrosion inhibition with increasing fatty acid chain lengths may be ascribed to several factors, including higher melting points with longer chain lengths, and/or increased intermolecular forces. Inhibitors having chain lengths<10 have melting points below room temperature, and corrosion inhibitor performance appears to have increased most substantially as the melting points increased above room temperature (e.g. myristic, with 14 carbons has a melting temperature of 54.2° C.). The two longest chains tested, arachidic and behenic acid, were too nonpolar to be dissolved in ethanol alone, and therefore were dissolved in a 4:1 ethanol/chloroform mixture. To enable comparison with the shorter chain data set (n=1-18), where only ethanol was the solvent, stearic acid was also dissolved in the 4:1 ethanol to chloroform ratio. When stearic acid was dissolved in the 4:1 mixture, the amount of Prussian blue formed on the plate decreased slightly, possibly due to improved solubility that allowed for better dispersion compared to the ethanol-only solutions. That this simple colorimetric technique detected differences in the inhibitory nature of these monolayers further demonstrated the excellent sensitivity of the sensors.

Figure 15:
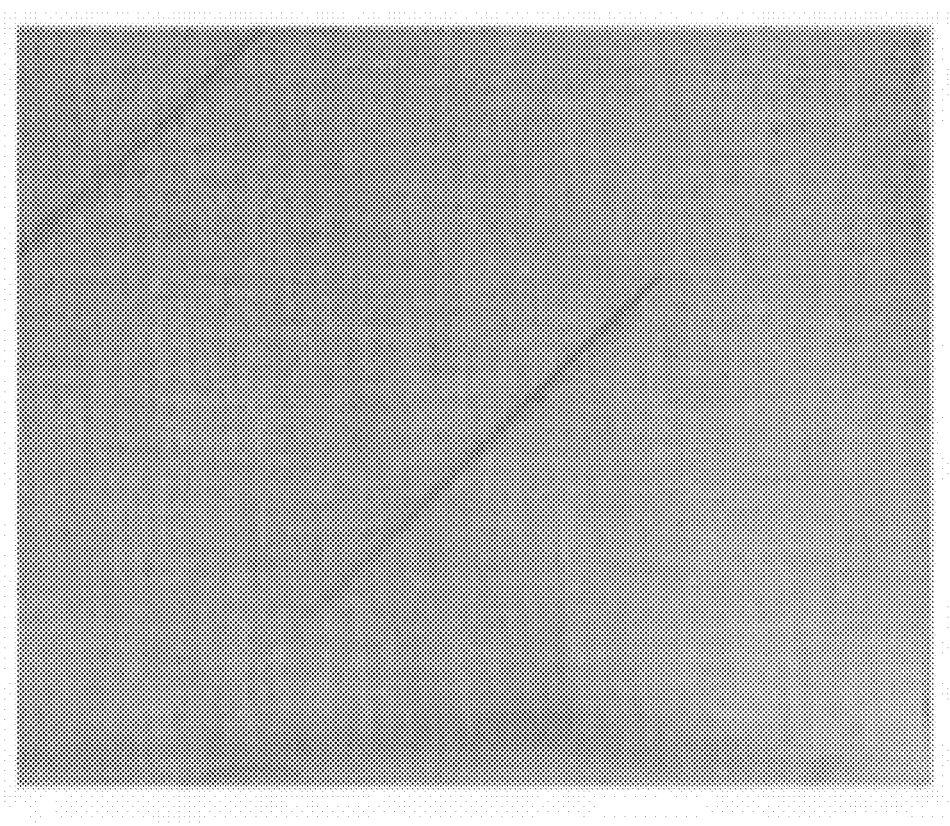
FIG. 15 is a digital image showing a steel plate with a line scratched through a steric acid film and into the metal.
Figure 16:
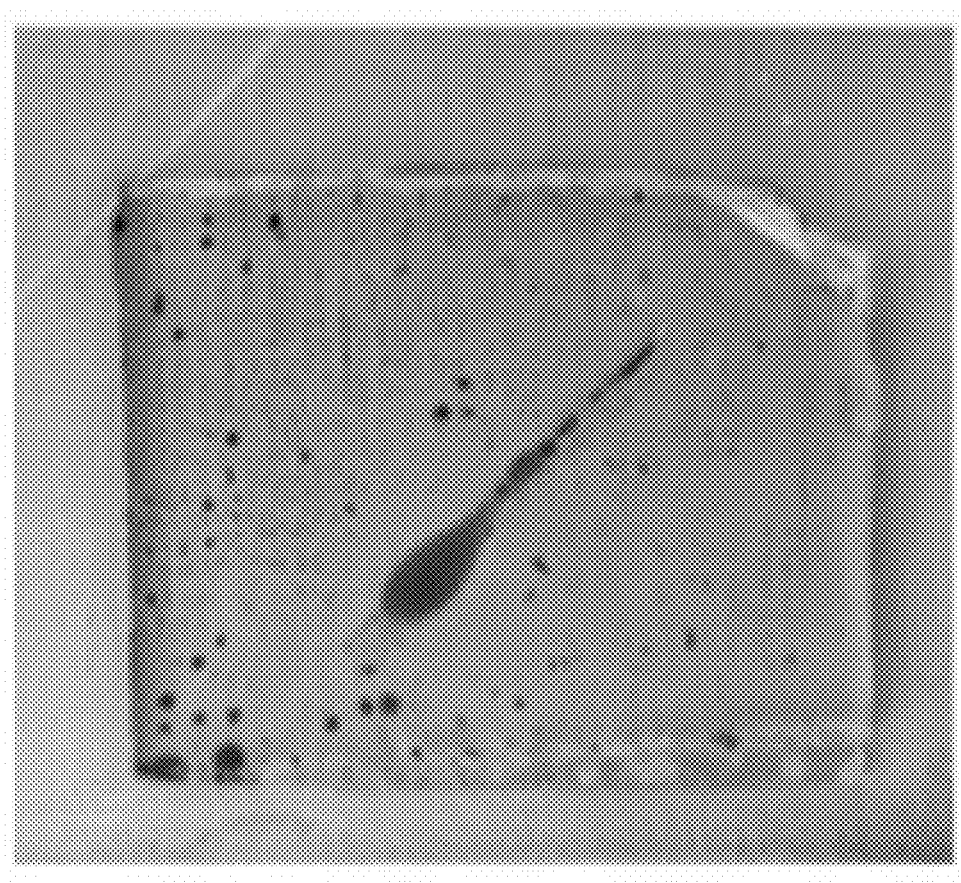
FIG. 16 is a digital image showing the steel plate from FIG. 15 taken 30 minutes after a gel as disclosed herein was applied.

As can be seen in FIGS. 15 and 16, there were also instances where deliberate damage (scratches) on the plate were distinguishable by the localized formation of Prussian blue along the contours of the damage. The ability to detect such localized damage would allow for area-specific treatment, therefore lessening repair costs.

Figure 17:
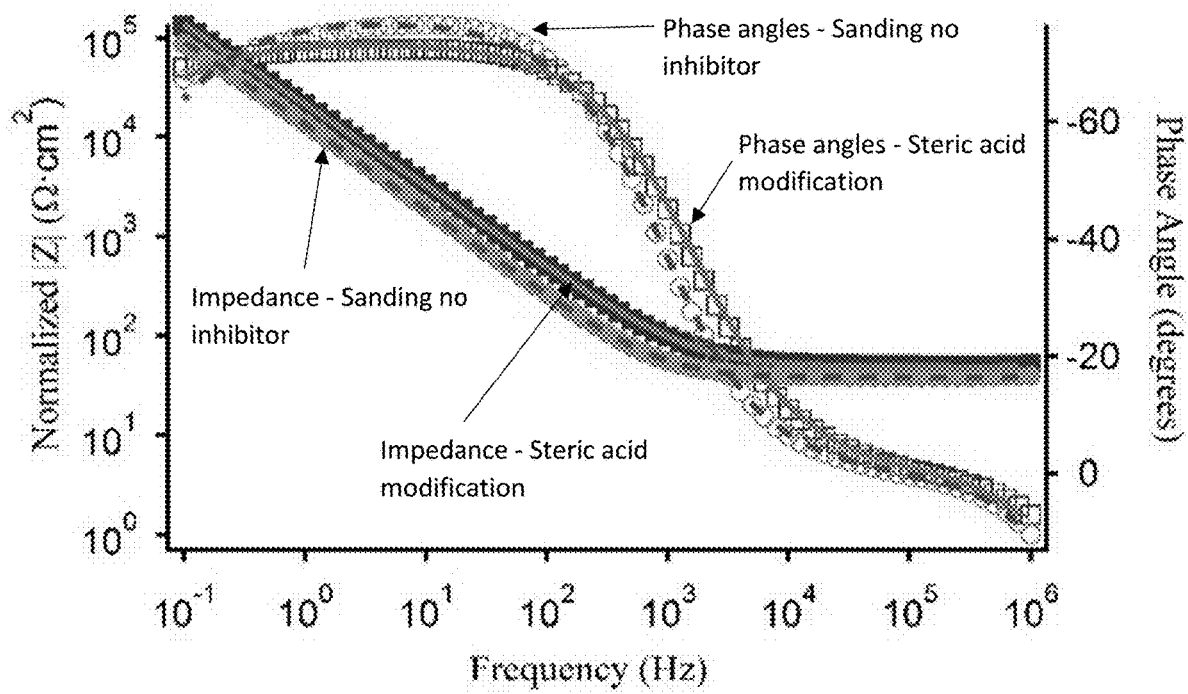
FIG. 17 is a graph of normalized impedance and phase angle versus frequency, illustrating representative impedance plots of corrosion inhibitors on steel, with the green circles representing a plate tested immediately after sanding with no inhibitors added and the pink squares represent a plate modified with stearic acid, and the closed markers illustrating the impedance modulus spectra, while open markers are the phase angles.
Figure 18:
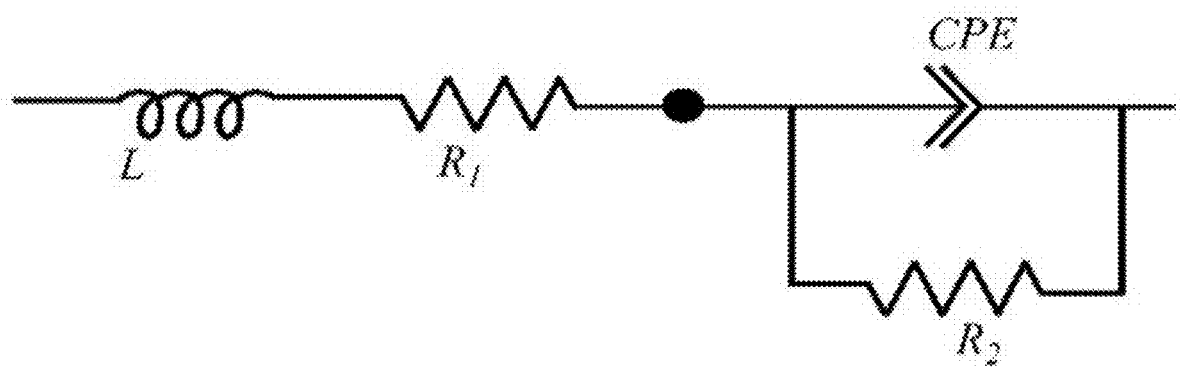
FIG. 18 is a circuit diagram, illustrating an equivalent circuit model that was used to fit all the EIS plots without added ferricyanide, where L=inductor, $R_1$=solution resistance, CPE=constant phase element and $R_2$=charge transfer resistance.
Figure 19:
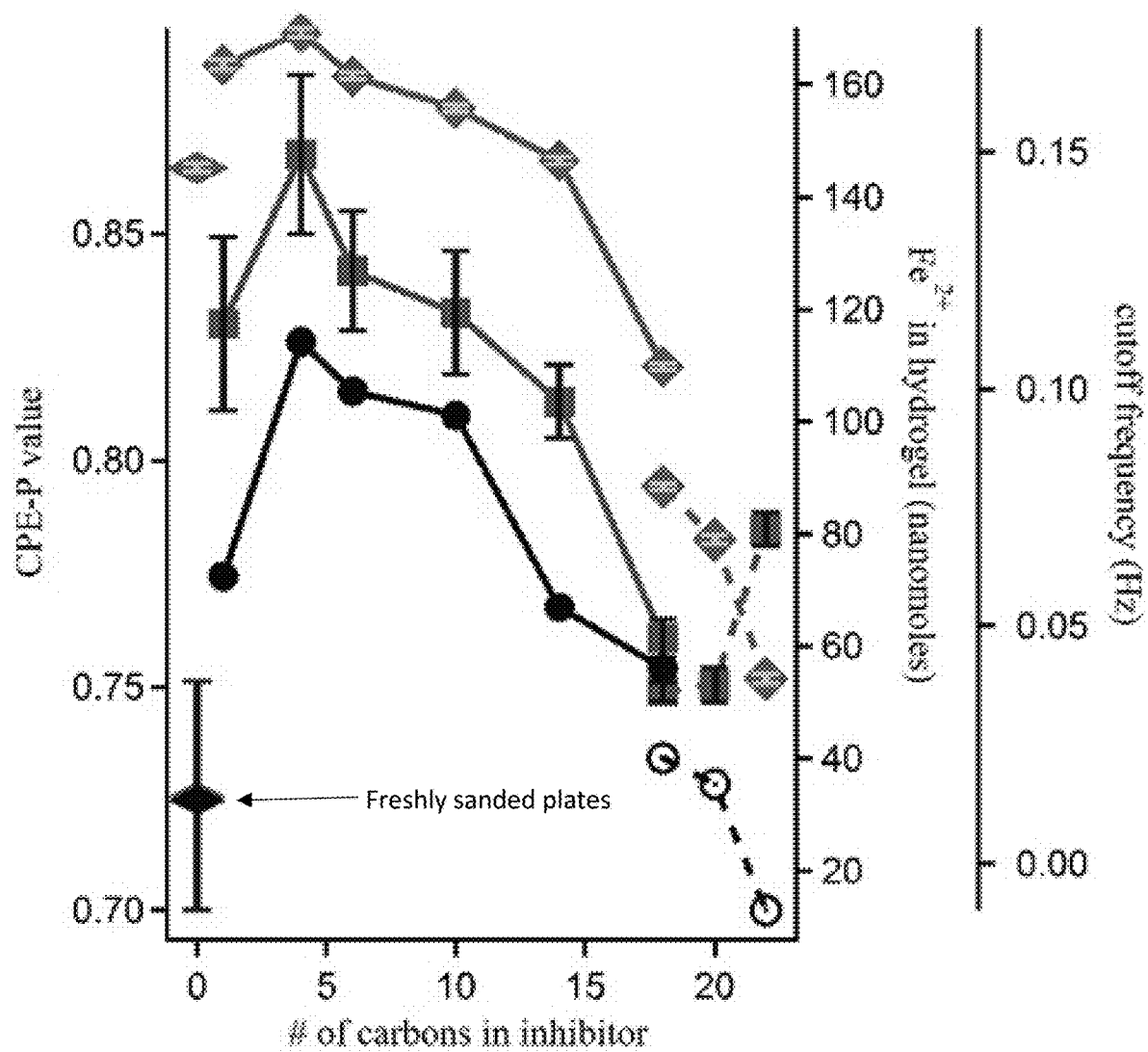
FIG. 19 is a graph of CPE-P value and amount of $Fe^{2+}$ in the hydrogel and cutoff frequency versus number of carbons in the corrosion inhibitor, providing a comparison of colormetric trends with EIS CPE-P values and cutoff frequencies.

The hydrogel sensors were also evaluated for their electrochemical response to transition metal ions and to the formation of Prussian blue. Standard cell EIS (using a standard glass cell with liquid electrolyte) was attempted but proved unsuccessful, as the plates corroded too quickly under the strong electrolyte. Hydrogel cell EIS provided a successful alternative, as it lessens the oxidative conditions compared to standard cell EIS and has been found to be more sensitive to surface phenomena. Typical Bode plots for plates treated with and without corrosion inhibitor are shown in FIG. 17. At the highest frequencies, instrumental inductance was present. The solution resistance of the hydrogel was seen in the high- to mid-range frequencies, before a capacitive region attributed to the double layer formed at the interface of the steel and the hydrogel solid electrolyte. At the lowest frequencies, the beginnings of a resistor was seen, and attributed to the charge transfer resistance. Greater insight into the inhibitory behavior of the treated panels can be gained from closely examining the individual circuit element(s) that vary depending on surface treatment. FIG. 19 provides a comparison of colorimetric trends with EIS CPE-P values and cutoff frequencies. With respect to FIG. 19, blue circle markers represent the average nanomoles of $Fe^{2+}$ present, the green diamond markers are the plotted CPE-P values and the red square markers are the cutoff frequencies. The solid lines represents corrosion inhibitors that were dissolved in ethanol alone, while the dashed lines represent corrosion inhibitors that were dissolved in a 4:1 mixture of ethanol and chloroform. The disconnected diamond markers represent freshly sanded plates.

As can be seen in FIG. 19, the CPE-P values closely follow the quantitative colorimetric trend. The freshly sanded plate had a CPE-P value of 0.8644, while the plates soaked for 24 hours showed an increase in the CPE-P value, signifying the formation of more charged species at the surface. However, with increasing length of fatty acid chain, the CPE-P value once again decreased, as the fatty acids blocked access of the electrolyte to the plate surface, as is consistent with other studies. In the case of formic acid, since it lacks a chain of any length, its CPE-P value suggests the formation of an oxide layer that partially prevented the formation of charge layers at the surface. The cutoff frequency, calculated as $v_{cutoff}=1/(R_{ct} \times C_{dl})$, follows a similar trend as the other two plotted values. The cutoff frequency decreases from butyric (0.15 Hz) to stearic (0.05 Hz), indicating a reduction of the kinetic energy of the charge-carrying species as the chain length increases. As chain length extended beyond stearic acid, the trend started to deviate, possibly due to a decrease in the values of double layer capacitance ($C_{dl}$), while the charge transfer resistance values continued to increase. The values of the circuit elements provide insight into the surface structure of these systems: there likely exists disorder and/or packing defects that detract from the inhibitory quality of the longest two acid chains, which is seen as an effect on the organized structure of the double layer, while the average thickness of the layer continued to increase, which is seen as an increase in the charge transfer resistance.

Figure 20:
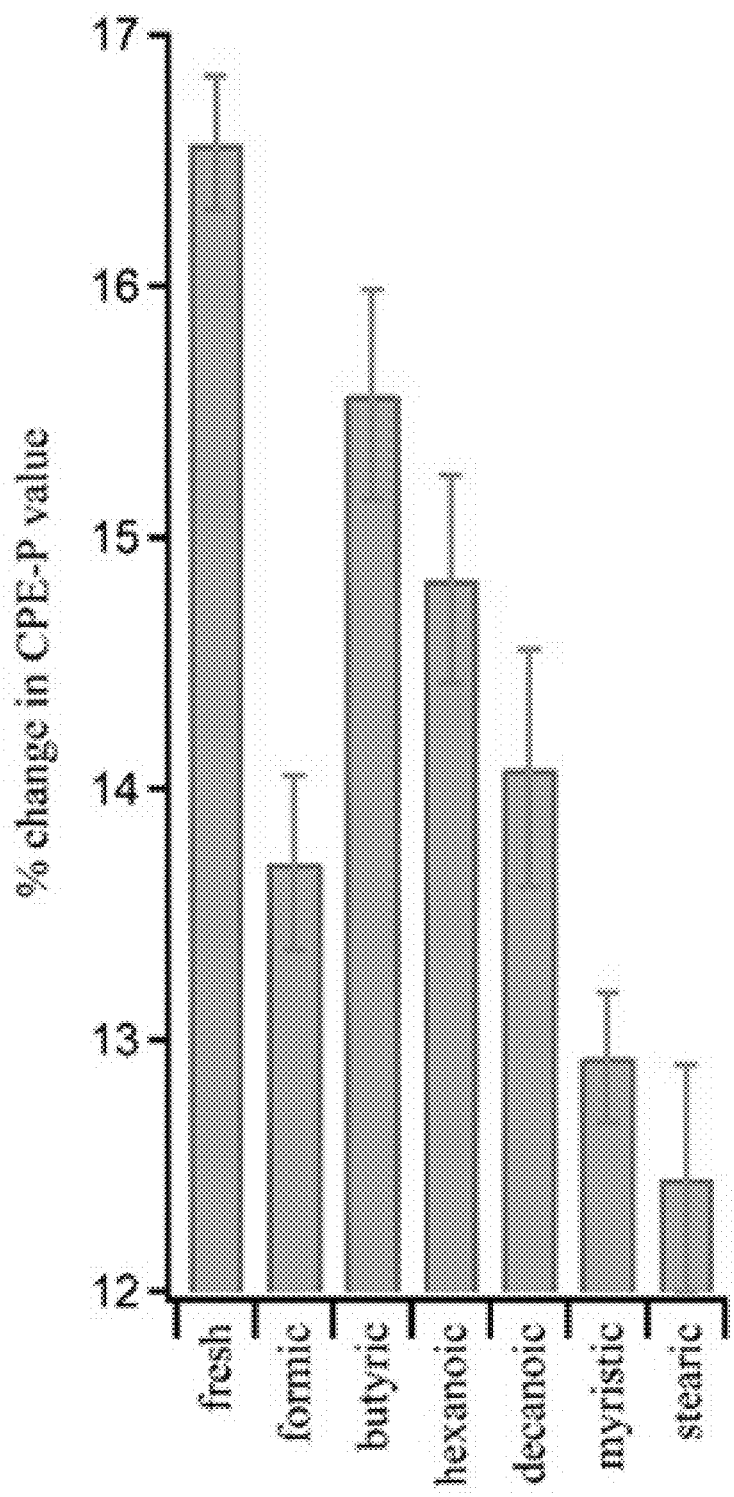
FIG. 20 is a graph of percent change in CPE-P value versus inhibitor, comparing the percentage decrease in CPE-P values for various treated panels.

These hydrogels were used to directly sense $Fe^{2+}$ by their electrical response. The gels were pre-loaded with ferricyanide and formation of Prussian blue within the gels was hypothesized to provide a detectable impedance change. Such hydrogel sensors showed a decrease in the CPE-P values when compared to hydrogels without ferricyanide. Formation of Prussian blue sequesters $Fe^{2+}$, a charged species which would ordinarily contribute to the double layer capacitance. The observed decrease in the CPE-P value indicated a reduction in the concentration of soluble iron species. As can be seen in FIG. 20, the percent change in the CPE-P values reflect the relative changes corresponding to each treatment. Freshly sanded plates experienced the greatest decrease in CPE-P value. There was no inhibitor present so those panels rapidly evolved $Fe^{2+}$ at their surfaces. As the chain length of the corrosion inhibitors increased, sequentially smaller changes in the CPE-P values were seen, due to the protective nature of the fatty acid chains inhibiting the production of $Fe^{2+}$ at the surfaces.

These observations in the colorimetric and EIS trends suggested that the production of soluble charged iron species from the treated substrates decreased with increasing chain length. This study included longer fatty acid chains than were used in some other studies in the hope of locating a turning point, after which no further gains in the inhibitory powers could be observed. The off-trend cutoff frequency for behenic acid suggests that there begins to be such a turning point at a chain length of 22. Chain lengths exceeding 22 are also insoluble in the solvent mixture used, while other commonly used nonpolar hydrocarbon solvents have been found to form dimers with fatty acids, rendering them insoluble. Fatty acids with chain lengths greater than 22 also greatly increase in cost, and these factors limit their practical applicability.

Figure 21:
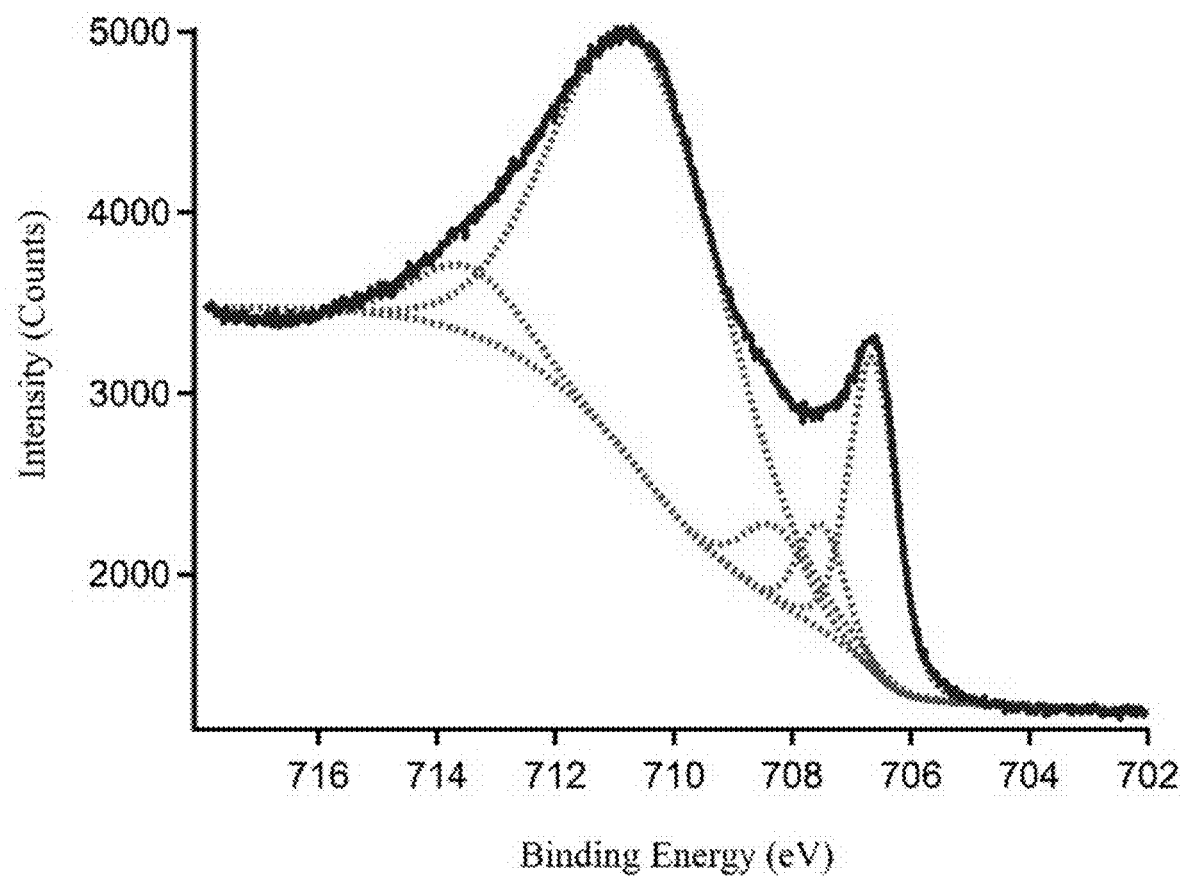
FIG. 21 is a graph of intensity versus binding energy, illustrating the $Fe2p_{3/2}$ portion of an XPS plot of a steel plate that was modified with stearic acid.
Figure 22:
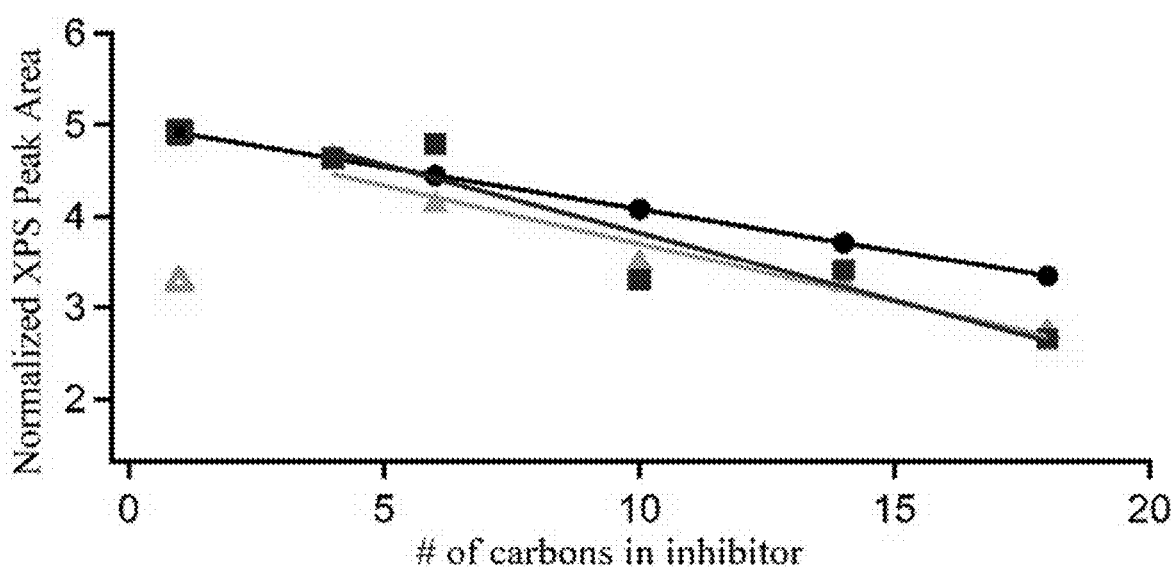
FIG. 22 is a graph of normalized XPS peak area versus number of carbons in the inhibitor, illustrating the trends of the XPS data.

In order to gain a more fundamental understanding of the interactions between fatty acids and steel panels, XPS was utilized. The XPS spectrum of the $Fe2p_{3/2}$ peak for a representative panel is shown in FIGS. 21 and 22. With respect to FIG. 21, the spectrum is illustrated by the solid trace, while the lighter dashed lines depict the peak fits. The peak at 706.64 eV was assigned to Fe(0), peaks at 707.5 eV and 708.27 eV were assigned to $Fe^{2+}$, while the peaks at 710.54 eV and 713.47 eV were assigned to $Fe^{3+}$ and the satellite peak of $Fe^{3+}$, respectively. Overall, the XPS spectra for the various panels showed a broad peak attributed to $Fe^{3+}$ with a maximum peak value that ranged from 710.38-710.59 eV (no discernible trend in the eV for the different chain lengths) and a satellite peak of $Fe^{3+}$ ($Fe^{3+}_{sat}$) at 712.66-713.47 eV. A distinct peak at 706.65-706.72 eV was attributed to Fe(0), while the shoulder between Fe(0) and $Fe^{3+}$ was attributed to peaks of $Fe^{2+}$ (707.4-707.59 eV) and (708.1-708.38 eV). The fit was greatly improved by the addition of a second peak, likely due to multiple Fe(II) species present on the surfaces.

The trends of the XPS data (FIG. 22) correlated with those found through the colorimetric and EIS data. With respect to FIG. 22, the black circle markers indicate the expected intensity decrease (y=−0.092), while red square and blue triangle markers indicate the normalized peak areas of $Fe^{2+}$ (y=−0.1486x, $R^2$=0.865) and $Fe^{2+}$ (y=−0.1271x, $R^2$=0.9618), respectively. The open markers indicate the values for formic acid, not used as part of the fit lines. The amount of both divalent and trivalent iron species detected decreased with increasing chain length, indicating that less of those species were produced by those plates. Formic acid demonstrated less $Fe^{2+}$ and Fe(0) species than butyric acid but increased $Fe^{3+}$, which supports the visual observations made for formic acid, namely that it permitted more advanced stages of corrosion than the other treated plates.

In this study a simple quantitative colorimetric technique was used to quickly confirm the presence of nanomole quantities of specific ions. As noted, Prussian blue has many transition metal analogs and, based on prior success, it is likely that these analogs could also be used as other specific ion sensors. The impedance characteristics of the corrosion inhibitor thin films, based on equivalent circuits, matched very well with the colorimetric data, confirming the disclosed technique as a comparable technique for dual mode sensing (i.e. spectro-electrochemical detection). The impedimetric data also showed that with longer chain length there is a decreased cutoff frequency and greater resistance to charge transfer. The CPE-P values suggest that there were decreased available charged species present on the surface as a result. This was also borne out by the XPS data, which showed decreased oxidized species with increasing chain length. To the inventors' knowledge, this is the first study where quantitative amounts of specific ions solubilized from a corroding metal surface have been directly recorded and visualized via a portable, low-cost technique. It is hoped that this will serve as a useful study for the development of quantitative benchmarks in corrosion processes.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

We claim:

1. A method for detecting metal ions, comprising:
   contacting a hydrogel with, in any order, a sample suspected of comprising one or more metal ions having an atomic weight greater than sodium, and a solution comprising a fluorescent dye, nanoparticle, colorimetric tag, or combination thereof;
   determining at least one characteristic of the hydrogel, wherein the characteristic is (i) a color of the hydrogel, (ii) a conductivity of the hydrogel, (iii) a Raman spectrum of the hydrogel, (iv) an infrared spectrum of the hydrogel, (v) a change in size or mass of the hydrogel, or (vi) any combination thereof; and
   determining a presence or absence of the one or more metal ions in the sample based upon the at least one characteristic determined.

2. The method of claim 1, wherein the hydrogel comprises water and cross-linked hydrophilic organic polymer molecules, the organic polymer molecules comprising head groups selected from carboxylic acids, ammonium ions, sulfonates, amides, amines, phosphates, phosphonates, hydroxyls, thiols, and combinations thereof.

3. The method of claim 1, wherein the fluorescent dye, nanoparticle, colorimetric tag, or combination thereof, comprises ferricyanide, ferrocyanide, or a combination thereof.

4. The method of claim 1, further comprising soaking the hydrogel in an electrolyte solution for a period of time prior to contacting the hydrogel with the sample and fluorescent dye, nanoparticle, colorimetric tag, or combination thereof, the electrolyte solution comprising an aqueous solution of NaCl, KCl, RbCl, CsCl, $MgCl_2$, $CaCl_2$, $SrCl_2$, or a combination thereof or any ionic electrolyte or combination of ionic electrolytes solutions.

5. The method of claim 1, further comprising soaking the hydrogel in an aqueous solution for a period of time prior to contacting the hydrogel with the sample and fluorescent dye, nanoparticle, colorimetric tag, or combination thereof, the aqueous solution comprising an organic solvent, humectant, buffer, or a combination thereof.

6. The method of claim 5, wherein the organic solvent, humectant, buffer, or a combination thereof, comprises ethylene glycol, glycerol, dimethyl sulfoxide, methanol, ethanol, 2,2-bis(hydroxymethyl)-2,2',2"-nitrilotriethanol, tris(hydroxymethyl)aminomethane, or a combination thereof.

7. The method of claim 1, wherein the at least one characteristic determines that metal ions are present in the sample, and the method further comprising quantifying the extent to which the one or more metal ions have been absorbed by the hydrogel by:
   measuring an intensity of the color; and
   correlating the intensity of the color to a concentration of the one or more metal ions.

8. The method of claim 1, wherein the at least one characteristic comprises the conductivity of the hydrogel and determines that metal ions are present in the sample, and the method further comprising quantifying the extent to which the one or more metal ions have been absorbed by the hydrogel by:
   determining the conductivity of the hydrogel;
   comparing the conductivity of the hydrogel to a baseline conductivity of the hydrogel prior to contact with the sample to determine a change in conductivity; and
   (i) identifying the metal ion based on the change in conductivity as one of a group of metal ions known to increase conductivity of the hydrogel or as one of a group of metal ions known to decrease conductivity of the hydrogel, (ii) quantifying the one or more metal ions absorbed by the hydrogel by correlating the change in conductivity to a concentration of the one or more metal ions, or (iii) both (i) and (ii).

9. The method of claim 8, wherein determining the conductivity of the hydrogel comprises:
   contacting the hydrogel with two electrodes;
   applying an alternating current across the two electrodes;
   measuring an electrochemical impedance;
   calculating the conductivity of the hydrogel based on the electrochemical impedance; and
   determining an amount of the one or more metal ions in the hydrogel based on the calculated conductivity.

10. The method of claim 1, wherein the at least one characteristic comprises the size of the hydrogel, the method further comprising:
    determining a first size or mass of the hydrogel prior to contact with the solution comprising the fluorescent dye, nanoparticle, colorimetric tag, or combination thereof, and the sample suspected of comprising one or more metal ions;
    determining a second size or mass of the hydrogel after contact with both the solution comprising the fluorescent dye, nanoparticle, colorimetric tag, or combination thereof, and the sample suspected of comprising one or more metal ions;
    comparing the second size or mass with the first size or mass to provide a comparison; and
    (i) identifying the metal ion based on the comparison as one of a group of metal ions known to increase the size or mass of the hydrogel or one of another group of metal ions known to decrease the size or mass of the hydrogel, (ii) quantifying a concentration of the metal ion based at least in part on the comparison, or (iii) both (i) and (ii).

11. The method of claim 1, further comprising determining an identity of the one or more metal ions by:
    (i) identifying the color of the hydrogel as indicative of a particular metal ion;
    (ii) identifying characteristic peaks in the Raman spectrum as indicative of a particular metal ion;

(iii) identifying characteristic peaks in the infrared spectrum as indicative of a particular metal ion; or
(iv) any combination of (i), (ii), and (iii).

12. The method of claim 1, wherein the hydrogel is contacted with the sample suspected of comprising one or more metal ions, and then with the solution comprising a fluorescent dye, nanoparticle, colorimetric tag, or combination thereof.

13. The method of claim 1, wherein the hydrogel is contacted with the solution comprising a fluorescent dye, nanoparticle, colorimetric tag, or combination thereof, and then with the sample potentially comprising one or more metal ions.

14. The method of claim 12, wherein contacting the hydrogel with the solution comprises:
removing the hydrogel from contact with the sample;
applying an aliquot of the solution to a surface of the hydrogel; and
waiting for a time period of 10-60 minutes before determining the at least one characteristic of the hydrogel.

15. The method of claim 14, wherein the aliquot of the solution comprises ferricyanide or ferrocyanide ions in an amount stoichiometrically greater than or equal to a maximum amount of metal ions that the hydrogel can absorb.

16. The method of claim 1, wherein the metal ion is a transition metal ion, lanthanide metal ion, aluminum ion, arsenic ion, bismuth ion, indium ion, lead ion, tin ion, or any combination thereof.

17. The method of claim 2, wherein the hydrophilic organic polymers comprise monomers selected from acrylate monomer, vinyl monomer, or a combination thereof.

18. The method of claim 2, wherein the hydrophilic organic polymers comprise monomers selected from 2-acrylamido-2-methyl-1-propanesulfonic acid, acrylic acid, acrylamide, methacrylic acid, vinyl alcohol, vinyl acetate, vinyl benzoic acid, vinyl sulfonic acid, maleic acid, 2-hydroxyethyl methacrylate, 2-hydroxypropyl methacrylate, lactic acid, itaconic acid, 3-allyloxy-2-hydroxy-1-propanesulfonic acid, or a combination thereof.

19. The method of claim 2, wherein the hydrogel is a cross-linked poly(acrylic acid-co-2-acrylamido-2-methyl-1-propanesulfonic acid (poly(AA-AMPS)) hydrogel comprising 2-acrylamido-2-methyl-1-propanesulfonic acid and poly(acrylic acid).

20. The method of claim 19, wherein:
the cross-linked poly(AA-AMPS) hydrogel has a weight percent ratio of 2-acrylamido-2-methyl-1-propanesulfonic acid to poly(acrylic acid) from 1.5 to 2.0;
the cross-linked poly(AA-AMPS) hydrogel comprises 0.2-0.3 wt % N,N'-methylenebis(acrylamide);
the cross-linked poly(AA-AMPS) hydrogel further comprises a humectant; or
a combination thereof.

* * * * *